(12) United States Patent
Fearnside et al.

(10) Patent No.: US 10,889,787 B2
(45) Date of Patent: Jan. 12, 2021

(54) CUSTOMIZABLE ACCELERATED AGING FOR DISTILLED SPIRITS

(71) Applicant: Aeva Labs, Inc., Raleigh, NC (US)

(72) Inventors: Zachary Cameron Fearnside, Hendersonville, NC (US); Steven Frank Guido, Albuquerque, NM (US); Kevin Jeanneret, Frederick, MD (US)

(73) Assignee: AEVA LABS, INC., Raleigh, NC (US)

( * ) Notice: Subject to any disclaimer, the term of this patent is extended or adjusted under 35 U.S.C. 154(b) by 0 days.

(21) Appl. No.: 16/788,662

(22) Filed: Feb. 12, 2020

(65) Prior Publication Data

US 2020/0255777 A1    Aug. 13, 2020

Related U.S. Application Data

(60) Provisional application No. 62/805,110, filed on Feb. 13, 2019.

(51) Int. Cl.
*C12G 3/08* (2006.01)
(52) U.S. Cl.
CPC .................................. *C12G 3/08* (2013.01)
(58) Field of Classification Search
CPC . C12G 3/08; C12G 3/065; C12G 3/07; C12H 1/165; C12H 1/18; C12H 1/22; C12H 1/16
USPC ........... 99/275, 276, 277, 277.1, 277.2, 451; 426/124, 238, 248, 397, 398, 422, 495, 426/552, 592
See application file for complete search history.

(56) References Cited

U.S. PATENT DOCUMENTS

| 4,210,676 A | 7/1980 | Dudar et al. |
| 5,173,318 A | 12/1992 | Leu et al. |
| 6,506,430 B1 | 1/2003 | Zimlich, III et al. |
| 6,703,060 B1 | 3/2004 | Gross et al. |
| 6,869,630 B2 | 3/2005 | Gross et al. |
| 7,063,867 B2 | 6/2006 | Tyler, III et al. |
| 9,637,712 B2 | 5/2017 | Davis |
| 9,637,713 B2 | 5/2017 | Davis |
| 10,087,406 B2 | 10/2018 | Bailey et al. |
| 10,196,595 B2 | 2/2019 | Butte |
| 10,544,386 B2 | 1/2020 | Davis |
| 2003/0110951 A1 | 6/2003 | Tyler et al. |
| 2005/0123658 A1 | 6/2005 | Tyler et al. |
| 2010/0092636 A1 | 4/2010 | Watson et al. |
| 2011/0070330 A1 | 3/2011 | Watson et al. |

(Continued)

FOREIGN PATENT DOCUMENTS

| CN | 102703297 A | 10/2012 |
| CN | 102746980 A | 10/2012 |

(Continued)

*Primary Examiner* — Phuong T Nguyen
(74) *Attorney, Agent, or Firm* — NEO IP

(57) ABSTRACT

Methods, systems, and apparatuses for the accelerated aging of beverages, including distilled spirits are disclosed. A spirit is aged through a modular approach that targets development of individual sensory characteristics. In one embodiment, a spirit undergoes ultrasonic cavitation in the presence of wood chips, heating in the presence of wood chips, ultrasonic cavitation without wood chips, heating without wood chips, and intermittent aeration. The process is operable to produce a highly customized spirit and achieve a taste, bouquet, and color similar to that of traditionally aged spirits.

18 Claims, 18 Drawing Sheets

(56) References Cited

U.S. PATENT DOCUMENTS

| | | |
|---|---|---|
| 2011/0070331 A1 | 3/2011 | Watson et al. |
| 2013/0149423 A1 | 6/2013 | Lix |
| 2013/0330454 A1 | 12/2013 | Mahamuni |
| 2015/0197716 A1 | 7/2015 | Davis |
| 2015/0337248 A1 | 11/2015 | Davis |
| 2016/0081373 A1 | 3/2016 | Coyne et al. |
| 2016/0129407 A1 | 5/2016 | Wrosch et al. |
| 2016/0289619 A1 | 10/2016 | Mancosky |
| 2016/0355771 A1 | 12/2016 | Davis |
| 2016/0376538 A1 | 12/2016 | Niazi |
| 2017/0107467 A1 | 4/2017 | Bailey et al. |
| 2017/0233688 A1 | 8/2017 | Davis |
| 2017/0335264 A1 | 11/2017 | Bailey et al. |
| 2017/0369831 A1 | 12/2017 | Dhesi et al. |
| 2018/0245030 A1 | 8/2018 | Mancosky |
| 2018/0320118 A1 | 11/2018 | Mancosky |
| 2018/0346855 A1 * | 12/2018 | Davis .................. C12G 3/07 |

FOREIGN PATENT DOCUMENTS

| | | |
|---|---|---|
| WO | 2014152924 A1 | 9/2014 |
| WO | 2016024084 A1 | 2/2016 |
| WO | 2017066740 A1 | 4/2017 |
| WO | 2017153618 A1 | 9/2017 |

\* cited by examiner

FIG. 12

| Spirit Type | Typical Mash Bill Contents | Usual Traditional Aging Vessel | Traditional Aging Length | Typical Color Profile | Common Flavors & Aromas | Common Mouthfeel & Smoothness |
|---|---|---|---|---|---|---|
| Bourbon | >51% Corn | New Charred Barrel | 1 Year to 10+ Year | Rich Amber | Sweet, vanilla, Brown Sugar, Caramel, Honey, Tobacco | Harsh, tannic bite, astringent, viscous, chewy |
| Rye Whiskey | >51% Rye | New Charred Barrel | 1 Year to 10+ Year | Rich Amber | Spicy, Pepper, Vanilla, Toffee, Fruity, Dry | Harsh, tannic bite, astringent, viscous, chewy |
| Aged Gin | N/A | New or Used Barrel | 3 months to 2 years | Light Gold | Caramel, oak, vanilla, juniper, floral, spice | Little to no tannin, light depending on style |
| Irish Whiskey | Primarily Malted + Unmalted Barley | Used Barrel | 3 years to 10+ years | Pale straw to light amber | Smooth, sweet, vanilla, malty, floral | Creamier, chewy, viscous, less astringent |
| Scotch Whiskey | Malted Barley | Used Barrel | 3 years to 10+ years | Pale Straw to rich amber | Dried fruit, grass, nutmeg cinnamon, smoke, salty, rubber | Creamier, chewy, viscous, less astringent |
| Tequila (Reposado) | Agave | Used Barrel | 2 months to 12 months | Light Gold | Oak, Vanilla, agave | Light, low viscosity, low astringency |
| Tequila (Anejo) | Agave | Used Barrel | 1 year to 3 years | Rich Amber, Gold | Caramel, vanilla, Oak, Toffee, Peppery, floral | Silkier, creamier than Reposado, low tannins, low astringency |

FIG. 13A
Materials

| Variable | Effect | Relationship |
|---|---|---|
| Working Fluid Proof | Flavor intensity produced when final product is lowered to beverage proof after processing | Inversely Proportional |
| | Extracted compounds from wood and other organic material vary based on alcohol/water ratio | Higher proof results in more alcohol soluble compounds being extracted and vice versa. |
| Wood Type | Flavor | Direct Effect |
| | Color | Direct Effect |
| Wood Char/Toast Amount | Flavor | Different toast levels change flavors and aromas developed. Lighter toasts are usually fruitier, and heavier toasts to charred are usually sweet, candy-like. |
| | Color | Proportional |

FIG. 13B

Sonication with Organic Material

| Variable | Effect | Relationship |
|---|---|---|
| Time or Watt-Hours | Wood Compounds Extracted | Proportional |
| Temperature | Aroma & Flavor | Different Aroma/Flavor profile depending on temperature. Examples are given at three selected temperatures:<br><br>85F:<br>Characterized by loss of flavor/aroma and introduction of non-desirable flavor/aroma, including: solvent-like, over extracted, chemical-esque<br><br>75F:<br>Characterized by bright flavor and aromas, including: fruity, acetone, acidic<br><br>65F:<br>Characterized by dark flavors and aromas, including: coffee, roasty-toasty |

FIG. 13C

Heat with Organic Material

| Variable | Effect | Relationship |
|---|---|---|
| Time | Color Development | Logarithmic |
| | Flavor | Intensity is Proportional (ex. more time results in a more intense flavor, but does not necessarily change the flavor) |
| | Aroma | Intensity is Proportional (ex. more time results in a more intense aroma, but does not necessarily change the aroma to a different scent) |
| Temperature | Color Development | Color saturation cap proportional |
| | Aroma & Flavor | Different Aroma/Flavor profile depending on temperature. Examples are given at two selected temperatures:<br><br>125°F:<br>Characterized by bright flavors and aromas, including: coffee, light red fruit, acetone<br><br>165°F:<br>Characterized by dark flavors and aromas, including: dark chocolate, cherries, coffee |

FIG. 13D

Sonication without Organic Material

| Variable | Effect | Relationship |
|---|---|---|
| Time or Watt-Hours | Harshness | Inversely Proportional |

FIG. 13E

Heat without Organic Material

| Variable | Effect | Relationship |
|---|---|---|
| Time | Flavor or Aroma Intensity | Logarithmically Proportional |
| Temperature | Aroma/Flavor | Different Aroma/Flavor profile depending on temperature. Examples are given at two selected temperatures:<br><br>125°F:<br>Characterized by bright flavors and aromas, including: acetone, red fruit<br><br>165°F:<br>Characterized by dark flavors and aromas, including: caramel and black fruit |

CUSTOMIZABLE ACCELERATED AGING FOR DISTILLED SPIRITS

CROSS REFERENCES TO RELATED APPLICATIONS

This application is related to and claims priority from the following U.S. patents and patent applications. This application is a Non-Provisional Patent Application of U.S. Provisional Patent Application No. 62/805,110, filed Feb. 13, 2019, which is incorporated herein by reference in its entirety.

BACKGROUND OF THE INVENTION

1. Field of the Invention

The present invention relates to accelerated aging of liquid consumables, and more specifically to systems, methods, and apparatuses for accelerating the aging of fermented beverages, including distilled alcoholic drinks. Systems, methods, and/or apparatuses adapted and designed for making beverages or beverage intermediate, which includes means for treating products of primary (first) ethyl alcoholic fermentations for the purpose of making beverages, or beverage intermediates, therefrom, and which are especially adapted for aging, refining, and/or purifying alcoholic beverages and potable alcohols.

2. Description of the Prior Art

Fermented beverages have traditionally been aged in barrels for many years in order to develop a character of desired tastes, smells, and colors. Smooth, complex tastes and smells as well as a dark color are often preferred characteristics of aged distilled spirits, such as whiskey. For distilled liquor products, once a distillate is achieved, it is usually placed in a barrel, cask, or other container and left to age for anytime between 2 and 18 or more years. Containers not made of wood are often filled with wood chips that interact with and age the spirit. The spirit slowly extracts compounds from the wood which take part in the aging reactions and result in the adoption of more complex flavors, smells, and darker colors. While the distillate sits in the container, compounds present in the liquid and barrel undergo several multi-stage interactions, including "esterification," wherein long-chained esters are formed through the reaction of acids and alcohol contained in the wood and distillate. Simultaneously, for barrel aged spirits, some oxygen is introduced through the porosity of the wood of the barrel, which react with and catalyze some of the interactions occurring during the aging process. The environment of the barrel, including surrounding humidity, temperature, and pressure, which are often uncontrolled and limited to regional conditions, can further determine the speed and type of reactions that occur in the spirit. Wood type, such as French Oak or American Oak, also has a large effect on the type and amount of molecules extracted. Often, the wood is charred or toasted, which serves to both filter an aging spirit, and the heat applied causes the three main polymers in wood (lignin, cellulose, hemicellulose) to pyrolyse, which yields volatile extractables. Typically, wood chips do not perform as well as barrels when used as a maturation agent, because they are typically used within sealed metal containers to prevent evaporation, and the product is aged for a much shorter time. Even in systems that are not sealed and attempt to use aeration, these systems still require aging timeframes equivalent to traditional barrel aging.

The amount of time required for barrel or chip aging usually provides challenges to spirit producers, since years can pass before a certain formulation is identified as having an undesirable taste, smell, or color. This time delay can pose serious issues to spirit producers, as it can add significant time and cost to the product development and customer feedback cycle. Similarly, predicting demand for a beverage that is aged for several years can often prove difficult. Some technologies have attempted to solve this problem and decrease the amount of time necessary for aging spirits. Notably, prior art methods have usually used individual processes of heat, pressure, sonication, or light, in an attempt to catalyze the interaction of the distillate with wood and/or promote esterification. However, most of these methods have not produced spirits with tastes, appearances, and bouquets that match those of spirits aged over several years via traditional means. Many of the heating technologies often produce a spirit with over-extracted tastes or simplistic flavor profiles. Even where some amount of desirable flavor has been produced, the equipment usually poses safety, security, and customizability concerns. For example, pressure-based implementations typically result in high-cost, safety, security, and regulatory issues. Since pressure-based systems are primarily extraction systems, processing through this equipment results in flavors not equivalent to traditional aging. Sonication has been attempted to mature spirits, but this alone often does not provide both extraction and development of wood compounds and flavors. Lastly, light-based processes have shown some success in artificial aging; however, light-based practices usually require expensive and dangerous glass-based equipment, wherein the combination of high heat and glass equipment produces dangerous operating conditions.

Furthermore, while several attempts have been made to produce aged spirits in a short amount of time, none of these solutions provide any significant level of customization or modularity. Many prior art systems are non-scalable and are unable to meet the needs of small and large distilleries alike.

Prior art patent documents include the following:

U.S. Pat. No. 10,196,595 for Accelerated Aging of Alcohol Drinks by inventor Butte, filed Apr. 8, 2016 and issued Feb. 5, 2019, is directed to: Devices and methods are described that enable controlled, repeatable and accelerated aging and infusion of alcohol containing beverages. The devices include newly reaction canisters in a computer controlled environment of valves, pumps, interconnecting plumbing, sensors and mixing and dispersing manifolds. Embodiments include devices and infusing materials. The infusing materials include traditional aging/infusing materials such as oaks traditionally used to make barrels for aging and infusion as well as other woods and a variety of non-wood infusion materials such as citrus, beans and seeds. The combination of controls, sensor and computer interface allows for repeatable preparation of aged/infused drinks and for development of new aged/infused drinks.

US Publication No. 2017/0369831 for System and process for enhancing sensory attributes in a beverage, filed Jun. 23, 2017 and published Dec. 28, 2017, is directed to: A system and process for enhancing sensory attributes of a beverage product are described. According to one embodiment, the process comprises providing a consumable beverage. A sonication process is applied to the consumable beverage utilizing a sonication unit. Chemical reactions in the consumable beverage are catalyzed to modify a sensory attribute of the consumable beverage.

US Publication No. 2018/0245030 for Aging of alcoholic beverages using controlled mechanically induced cavitation, filed Apr. 30, 2018 and published Aug. 30, 2018, is directed to: An extreme acceleration of the process of aging spirits to obtain aged liquors includes circulating the spirits through a cavitation zone within a controlled cavitation reactor and exposing the spirits therein to high energy cavitation induced shockwaves. Sources of flavor and color such as charred wood chips may be added to the spirits to provide the color and flavor of liquors aged for years in traditional charred oak barrels. The method and apparatus of the present invention obtains the same conversion of undesirable alcohols, flavor extraction, and color as years of aging in an oak barrel but does so in a matter of minutes or hours. The apparatus and method also can be used in conjunction with traditional aging techniques and methods and the total aging time is still reduced dramatically.

US Publication No. 2011/0070331, for Accelerating Aging of Ethanol-Based Beverages, filed Nov. 30, 2010 and published Mar. 24, 2011, is directed to: Systems and methods for accelerating the aging of distilled spirits are disclosed. The systems and methods may include increased reaction rates of ethanol with oxygen, acids, sugars, and/or other components within an ethanol mixture. The accelerated reactions may produce an aged alcohol in a matter of a few hours or days, whereas comparable alcohols aged conventionally would require many years. The accelerated aging of the ethanol may be performed to provide the end product with a desired flavor profile in a short period of time at a substantially reduced cost.

US Publication No. 2016/0355771, for Method for rapid maturation of distilled spirits using light and ultrasonic energy processes, filed Aug. 18, 2016 and published Dec. 8, 2016, is directed to: An improved system and process for rapidly producing distilled spirits having characteristics associated with a much longer maturation process is provided. The method involves (a) subjecting an unmatured spirit to ultrasonic energy at a power of at least 3 Watts/Liter for at least one hour while maintaining the temperature of the unmatured spirit between 90° F. and 150° F.; and (b) subjecting the unmatured spirit and wood to actinic light at a wavelength ranging from 400 nm to 1000 nm for a cumulative exposure of at least 2,280,000 lux hours. The disclosure also provides embodiments where a spirit processed with ultrasonic energy is mixed with a spirit that has been separately treated with light to give characteristics of a mature spirit.

U.S. application Ser. No. 16/612,058, for Systems and Methods for the Preparation of Ethanol-Containing Beverages, filed Nov. 8, 2019, is directed to: The present inventive concept relates generally to simulating the barrel aging or finishing process of distilled spirits in a rapid manner.

SUMMARY OF THE INVENTION

The present invention relates to accelerated aging of liquid consumables. Primarily, the invention is directed to aging distilled spirits. However, the invention is operable to be applied in the aging of other liquids, including but not limited to beer, wine, bitters, soda, balsamic vinegar, maple syrup, soy sauce, or hot sauce.

It is an object of this invention to employ specific heating, aeration, and ultrasonic cavitation processes in order to promote extraction of flavor and color from wood as well as promote development of the bouquet, smoothness, and mouthfeel of a spirit. A modular design ensures both granular control over taste, color, and bouquet or aroma as well as scalability for large volumes of product. The combination and (in some embodiments) order of specific processes provide for a unique system that is capable of aging consumable liquid products within a number of days instead of years, as required by traditional processes.

In one embodiment, the present invention is directed to a system for accelerating aging of a beverage, comprising: at least two reaction chambers, including a first reaction chamber and a second reaction chamber, wherein the first reaction chamber includes a wood load, and wherein the second reaction chamber does not include wood, at least one first ultrasonic transducer and at least one second ultrasonic transducer, wherein the at least one first ultrasonic transducer is connected to the first reaction chamber and the at least one second ultrasonic transducer is connected to the second reaction chamber, at least one temperature control system, wherein the at least one temperature control system includes at least one heating system and at least one cooling system, at least one fluid circulation pump, at least one valve, at least one gas infusion system, and a fluid, wherein the at least one fluid circulation pump is operable to circulate the fluid between the first reaction chamber and the second reaction chamber, and wherein the at least one valve is operable to open or close a connection between the first reaction chamber and the second reaction chamber, wherein the at least one first ultrasonic transducer is operable to apply a first ultrasonic energy to the fluid in the first reaction chamber, and wherein the at least one temperature control system is operable to simultaneously cool the fluid for at least some time during the application of the first ultrasonic energy, wherein the at least one temperature control system is operable to apply a first heat to the fluid and increase a temperature of the fluid, wherein the at least one second ultrasonic transducer is operable to apply a second ultrasonic energy to the fluid in the second reaction chamber, and wherein the at least one temperature control system is operable to simultaneously cool the fluid for at least some time during the application of the second ultrasonic energy, wherein the at least one temperature control system is operable to apply a second heat to the fluid and increase the temperature of the fluid, wherein the at least one first ultrasonic transducer is operable to apply the first ultrasonic energy, the at least one temperature control system is operable to apply the first heat, the at least one second ultrasonic transducer is operable to apply the second ultrasonic energy, and the at least one temperature control system is operable to apply the second heat, respectively, in sequence, wherein the valve is operable to close the connection between the first reaction chamber and the second reaction chamber before the application of the second ultrasonic energy, and wherein the at least one gas infusion system is operable to introduce at least one gas to the fluid.

In another embodiment, the present invention is directed to a method for accelerating aging of a beverage, comprising: circulating fluid between a first reaction chamber and a second reaction chamber, wherein the first reaction chamber includes a wood load, and wherein the second reaction chamber does not include wood, applying a first ultrasonic energy to the fluid in the first reaction chamber, and maintaining a first temperature of the fluid below approximately 85° F., applying a first heat to the fluid and maintaining a second temperature of the fluid of at least approximately 125° F., closing a connection between the first reaction chamber and the second reaction chamber, applying a second ultrasonic energy to the fluid in the second reaction chamber and simultaneously cooling the fluid for at least some time during the applying the second ultrasonic energy, applying a second heat to the fluid and maintaining a third temperature of the fluid of at least approximately 125° F., applying at least one gas to the fluid, wherein the applying the first ultrasonic energy, the applying the first heat, the closing the connection between the first reaction chamber and the second reaction chamber, the applying the second ultrasonic energy, and the applying the second heat in the second reaction chamber occur sequentially.

In a further embodiment, the present invention is directed to a system for accelerated aging of a beverage, comprising: at least two reaction chambers, including a first reaction chamber and a second reaction chamber, wherein the first reaction chamber includes an organic material load, and wherein the second reaction chamber does not include organic material, at least one first ultrasonic transducer and at least one second ultrasonic transducer, wherein the at least one first ultrasonic transducer is connected to the first reaction chamber and the at least one second ultrasonic transducer is connected to the second reaction chamber, at least one temperature control system, at least one fluid circulation pump, a gas infusion system, a fluid, and an organic material, wherein the at least one first ultrasonic transducer is operable to apply a first ultrasonic energy to the fluid in the first reaction chamber, and wherein the at least one temperature control system is operable to simultaneously maintain a first temperature of the fluid in the first reaction chamber below approximately 85° F., wherein the at least one temperature control system is operable to apply a first heat to the fluid and simultaneously maintain a second temperature of the fluid above approximately 120° F., wherein the at least one second ultrasonic transducer is operable to apply a second ultrasonic energy to the fluid in the second reaction chamber, and wherein the at least one temperature control system is operable to simultaneously cool the fluid for at least some time during the application of the second ultrasonic energy, wherein the at least one temperature control system is operable to apply a second heat to the fluid and maintain a third temperature of the fluid in the second reaction chamber of at least approximately 120° F., wherein the applying the first ultrasonic energy, the applying the first heat, the applying the second ultrasonic energy, and the applying the second heat do not occur simultaneously, and wherein the gas infusion system is operable to introduce at least one gas to the fluid.

In yet another embodiment, the present invention is directed to a method for accelerating aging of a beverage, comprising: circulating a fluid in at least one reaction chamber, wherein at least one of the at least one reaction chamber includes a wood load, applying a first ultrasonic energy to the fluid in the at least one reaction chamber and simultaneously maintaining a first temperature of the fluid below approximately 85° F., applying a first heat to the fluid and simultaneously maintaining a second temperature of the fluid greater than or equal to approximately 120° F., removing contact between the wood load and the fluid, applying a second ultrasonic energy to the fluid and simultaneously cooling the fluid for at least some time during the applying the second ultrasonic energy, applying a second heat to the fluid and simultaneously maintaining a third temperature of the fluid greater than or equal to approximately 120° F., introducing at least one gas to the fluid, wherein the applying the first ultrasonic energy, the applying the first heat, the removing the contact between the wood load and the fluid, the applying the second ultrasonic energy, and the applying the second heat occur sequentially.

These and other aspects of the present invention will become apparent to those skilled in the art after a reading of the following description of the preferred embodiment when considered with the drawings, as they support the claimed invention.

BRIEF DESCRIPTION OF THE DRAWINGS

FIG. 12 illustrates a table of common sensory characteristics of traditionally aged spirits.

FIG. 13A illustrates relationships between processing variables and product effects for material inputs according to one embodiment of the present invention.

FIG. 13B illustrates relationships between processing variables and product effects for sonication with organic material according to one embodiment of the present invention.

FIG. 13C illustrates relationships between processing variables and product effects for heating with organic material according to one embodiment of the present invention.

FIG. 13D illustrates relationships between processing variables and product effects for sonication without organic material according to one embodiment of the present invention.

FIG. 13E illustrates relationships between processing variables and product effects for heating without organic material according to one embodiment of the present invention.

DETAILED DESCRIPTION

Figure 1:
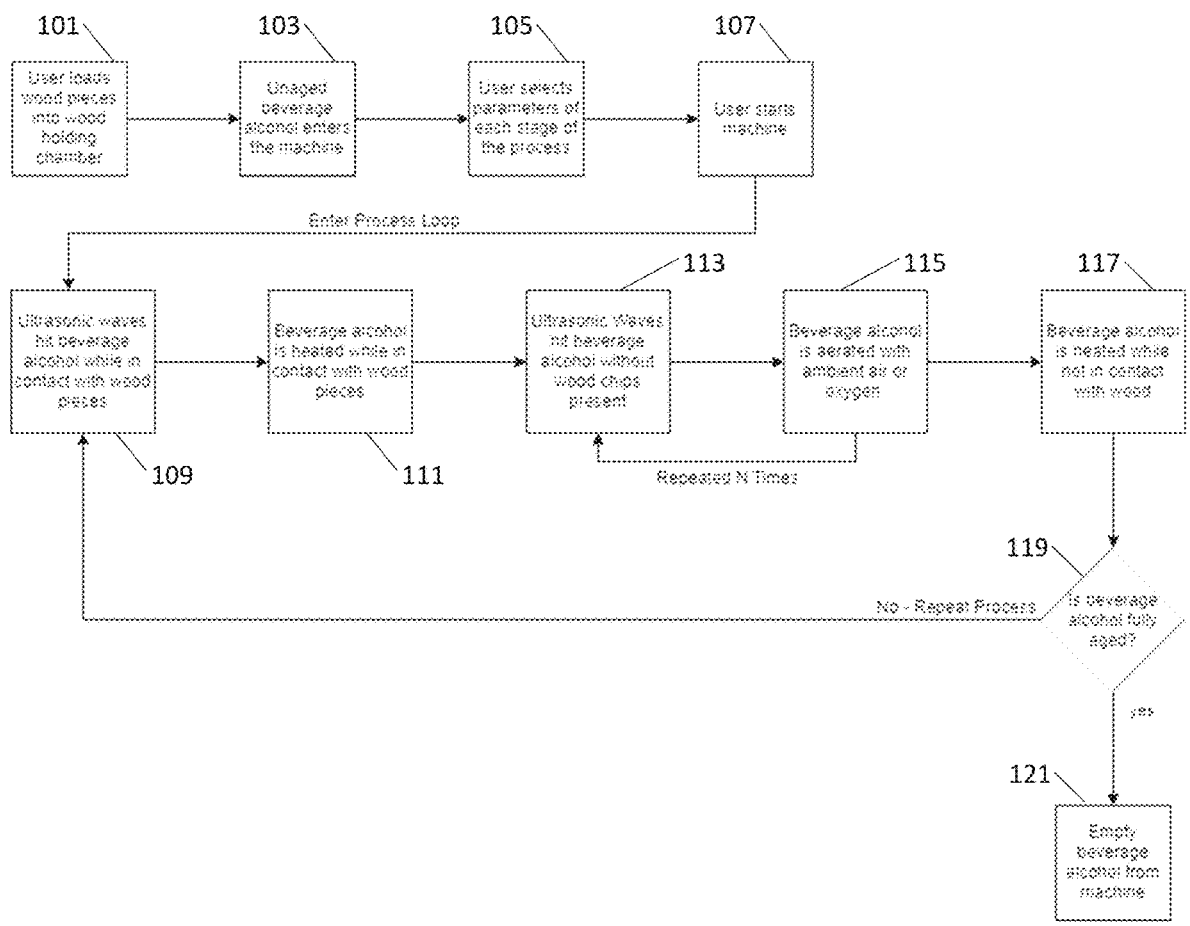
FIG. 1 illustrates a flowchart of an accelerated aging process according to one embodiment of the present invention.

The present invention is generally directed to modular accelerated aging processes for consumable liquids. Specifically, the present invention is a multi-stage aging process incorporating the application of ultrasonic energy and controlled heating both with and without the presence of an organic aging material, such as wood chips. The process further incorporates aeration through either ambient air or another gas aeration process. Notably, "aging" as disclosed herein refers to the maturation of a liquid consumable from a beverage that has generally simplistic, harsh, and bland characteristics to a beverage that is pleasing in at least taste, aroma, color, and mouthfeel. In contrast to traditional maturation methods, the present invention is directed to developing palatable characteristics in a much shorter time than required by traditional methods.

In one embodiment, the present invention is directed to a system for accelerating aging of a beverage, comprising: at least two reaction chambers, including a first reaction chamber and a second reaction chamber, wherein the first reaction chamber includes a wood load, and wherein the second reaction chamber does not include wood, at least one first ultrasonic transducer and at least one second ultrasonic transducer, wherein the at least one first ultrasonic transducer is connected to the first reaction chamber and the at least one second ultrasonic transducer is connected to the second reaction chamber, at least one temperature control system, wherein the at least one temperature control system includes at least one heating system and at least one cooling system, at least one fluid circulation pump, at least one valve, at least one gas infusion system, and a fluid, wherein the at least one fluid circulation pump is operable to circulate the fluid between the first reaction chamber and the second reaction chamber, and wherein the at least one valve is operable to open or close a connection between the first reaction chamber and the second reaction chamber, wherein the at least one first ultrasonic transducer is operable to apply a first ultrasonic energy to the fluid in the first reaction chamber, and wherein the at least one temperature control system is operable to simultaneously cool the fluid for at least some time during the application of the first ultrasonic energy, wherein the at least one temperature control system is operable to apply a first heat to the fluid and increase a temperature of the fluid, wherein the at least one second ultrasonic transducer is operable to apply a second ultrasonic energy to the fluid in the second reaction chamber, and wherein the at least one temperature control system is operable to simultaneously cool the fluid for at least some time during the application of the second ultrasonic energy, wherein the at least one temperature control system is operable to apply a second heat to the fluid and increase the temperature of the fluid, wherein the at least one first ultrasonic transducer is operable to apply the first ultrasonic energy, the at least one temperature control system is operable to apply the first heat, the at least one second ultrasonic transducer is operable to apply the second ultrasonic energy, and the at least one temperature control system is operable to apply the second heat, respectively, in sequence, wherein the valve is operable to close the connection between the first reaction chamber and the second reaction chamber before the application of the second ultrasonic energy, and wherein the at least one gas infusion system is operable to introduce at least one gas to the fluid.

In another embodiment, the present invention is directed to a method for accelerating aging of a beverage, comprising: circulating fluid between a first reaction chamber and a second reaction chamber, wherein the first reaction chamber includes a wood load, and wherein the second reaction chamber does not include wood, applying a first ultrasonic energy to the fluid in the first reaction chamber, and maintaining a first temperature of the fluid below approximately 85° F., applying a first heat to the fluid and maintaining a second temperature of the fluid of at least approximately 125° F., closing a connection between the first reaction chamber and the second reaction chamber, applying a second ultrasonic energy to the fluid in the second reaction chamber and simultaneously cooling the fluid for at least some time during the applying the second ultrasonic energy, applying a second heat to the fluid and maintaining a third temperature of the fluid of at least approximately 125° F., applying at least one gas to the fluid, wherein the applying the first ultrasonic energy, the applying the first heat, the closing the connection between the first reaction chamber and the second reaction chamber, the applying the second ultrasonic energy, and the applying the second heat in the second reaction chamber occur sequentially.

In a further embodiment, the present invention is directed to a system for accelerated aging of a beverage, comprising: at least two reaction chambers, including a first reaction chamber and a second reaction chamber, wherein the first reaction chamber includes an organic material load, and wherein the second reaction chamber does not include organic material, at least one first ultrasonic transducer and at least one second ultrasonic transducer, wherein the at least one first ultrasonic transducer is connected to the first reaction chamber and the at least one second ultrasonic transducer is connected to the second reaction chamber, at least one temperature control system, at least one fluid circulation pump, a gas infusion system, a fluid, and an organic material, wherein the at least one first ultrasonic transducer is operable to apply a first ultrasonic energy to the fluid in the first reaction chamber, and wherein the at least one temperature control system is operable to simultaneously maintain a first temperature of the fluid in the first reaction chamber below approximately 85° F., wherein the at least one temperature control system is operable to apply a first heat to the fluid and simultaneously maintain a second temperature of the fluid above approximately 120° F., wherein the at least one second ultrasonic transducer is operable to apply a second ultrasonic energy to the fluid in the second reaction chamber, and wherein the at least one temperature control system is operable to simultaneously cool the fluid for at least some time during the application of the second ultrasonic energy, wherein the at least one temperature control system is operable to apply a second heat to the fluid and maintain a third temperature of the fluid in the second reaction chamber of at least approximately 120° F., wherein the applying the first ultrasonic energy, the applying the first heat, the applying the second ultrasonic energy, and the applying the second heat do not occur simultaneously, and wherein the gas infusion system is operable to introduce at least one gas to the fluid.

In yet another embodiment, the present invention is directed to a method for accelerating aging of a beverage, comprising: circulating a fluid in at least one reaction chamber, wherein at least one of the at least one reaction chamber includes a wood load, applying a first ultrasonic energy to the fluid in the at least one reaction chamber and simultaneously maintaining a first temperature of the fluid below approximately 85° F., applying a first heat to the fluid and simultaneously maintaining a second temperature of the fluid greater than or equal to approximately 120° F., removing contact between the wood load and the fluid, applying a second ultrasonic energy to the fluid and simultaneously cooling the fluid for at least some time during the applying the second ultrasonic energy, applying a second heat to the fluid and simultaneously maintaining a third temperature of the fluid greater than or equal to approximately 120° F., introducing at least one gas to the fluid, wherein the applying the first ultrasonic energy, the applying the first heat, the removing the contact between the wood load and the fluid, the applying the second ultrasonic energy, and the applying the second heat occur sequentially.

None of the prior art discloses the modular, piecewise process disclosed in the present invention. Specifically, the modular design focuses on developing individual sensory variables of a liquid as opposed to replicating traditional, one-stop barrel aged processes. Targeting the extraction and maturation of taste, bouquet and/or aroma, and color individually allows for both greater control over an aged product as well an increased ability to scale an amount of spirit produced. In contrast to the prior art, embodiments of the present invention provide a high level of customizability into an accelerated aging process. While others have attempted to accelerate aging with mixed results, none of these systems have been able to both support the demand of large-scale producers while providing a high level of customizability over flavors and sensory characteristics equivalent to that of traditionally aged products. Further, none of the prior art has provided a single, integrated system that is operable to perform each of the disclosed processing stages and that requires the reduced human interaction for both processing and fluid transfer, as provided by the present invention.

Referring now to the drawings in general, the illustrations are for the purpose of describing one or more preferred embodiments of the invention and are not intended to limit the invention thereto.

The present invention is directed to a modular system that allows for finer control, customization, and scalability of an accelerated aging system. Prior art methods have lacked in the ability to produce aged alcohol at an accelerated rate with a volume, taste, aroma, and color equivalent to that of a sprit aged through traditional methods over an extended period of time. Conversely, the disclosed embodiments provide a modular approach to rapidly aging beverages, which allows finer control over individual sensory variables in a consumable liquid. The embodiments provided below are illustrated with respect to aging distilled beverages, such as whiskey. However, it should be noted that the process and system is operable to age other alcoholic or non-alcoholic consumables, including beer, wine, balsamic vinegar, maple syrup, soy sauce, or hot sauce, and utilize organic substances other than wood, including fruit zest, nuts, spices, vegetables, berries, whole fruit, or seeds.

FIG. 1 illustrates a flow chart of one embodiment of the present invention, wherein an alcoholic beverage ("the spirit") is matured through a modular process. In the preliminary stages, the machine receives the aging material 101, e.g., wood chips, which are placed into the reservoir (i.e., a reaction chamber). Preferably, the wood chips are placed in the reservoir packaged in a mesh container or tube to promote interaction of the spirit with the wood, is contained through the process, and is easily removable. Next, a reservoir of the Accelerated Aging System (AAS) is operable to receive the spirit 103 in an unaged form after production by a distiller. The spirit, in one embodiment, is in a completely unaged form. In another embodiment, it has undergone some aging process in a barrel, cask, with wood chips, or other means before being introduced to the AAS. The AAS is operable to receive parameters 105 indicating an aging stage of the intake beverage, desired customization levels and options (including levels and options for taste, color, mouthfeel, smoothness, or bouquet), and a type of beverage being aged. Once the AAS is activated 107, the machine begins STAGE 1 of the process 109. In one embodiment, the reservoir is a reaction chamber, wherein the reaction chamber is a reservoir adapted specifically for processing input fluid via heat, aeration, and/or sonication, and/or wherein the reaction chamber is specifically constructed for holding organic material for processing.

Generally, the five different stages of the illustrated embodiment include ultrasonic cavitation with wood, temperature-controlled compound extraction with wood, ultrasonic cavitation without wood, intermittent aeration, and temperature-controlled compound development without wood. During STAGE 1, the spirit is subjected to ultrasonic waves in the presence of wood 109. This process generally promotes extraction of compounds from the wood and replaces the long-term extractions that occur through traditional aging processes while maintaining pleasant and palatable characteristics of a finished product. The application of ultrasonic energy to the spirit or to a container wall holding the spirit creates pressure waves through the spirit and induces the formation of cavitation bubbles on the wood chips in contact with the liquid. When the bubbles implode, they collapse into the wood and break down cell walls of the wood, which allows for rapid extraction of compounds. Preferably, the ultrasonic process is performed at a lower temperature than has previously been performed in the prior art. In prior art implementations, ultrasonic cavitation was applied (typically as a solo process) at a high temperature, where in the high temperature was the result of either applied heat or as a result of the cavitation process itself. While sonication at high temperatures allows for quick color extraction from wood, the cavitation events are less powerful and thus do not penetrate as deeply into the wood or cause as much damage to the wood. Contrastingly, this embodiment of the present invention includes cavitation at lower temperatures, which results in more powerful cavitation events and deeper penetration of the wood, leading to the development of a more preferable flavor profile and a smoother taste that is similar to barrel-aged spirits.

STAGE 2 of the illustrated embodiment is directed to a process for extracting color and compounds from the wood that generally require high-temperatures to remove within a short amount of time (compared to traditional barrel aging). This approach of targeting specific high-temperature compounds and color is advantageous over a process that attempts to combine the development of multiple characteristics at once. Whereas prior art methods have attempted to replicate the single-step process of traditional barrel aging, this embodiment of the present invention allows for granular control over several sensory variables of the beverage. STAGE 1's steps and parameters narrowly target extracting compounds from the wood that are best extracted at lower temperatures, wherein color is generally not targeted in STAGE 1. STAGE 2, however, is focused on high-temperature compound extraction and color development. Once the beverage has completed STAGE 1, the AAS begins STAGE 2 111, wherein the beverage is heated while in contact with the wood. Heating the beverage to a high temperature in the presence of wood extracts color quickly, yet without long periods of sustained temperature does not result in as much flavor and aroma extraction and development. Since the low-temperature sonication and extraction processes occur separately from high-temperature extraction processes, the AAS is operable to perform at higher temperatures to extract high-temperature compounds and color, allowing for significant customization in sensory characteristics by balancing low temperature, high temperature, and sonication processes. However, within the short heating period of STAGE 2 some maturation of some of the compounds extracted in STAGE 1 begins. Heat acts as a natural catalyst in the reaction of the spirit with extracted wood compounds. Specifically, tannins and other compounds extracted from the wood are transformed into some of the intermediate molecules involved in the eventual development of esters and other desirable compounds. Some aromatic compounds are further extracted and developed during this stage, as well. Further development of these compounds and intermediate molecules is completed in the subsequent stages. Notably, "catalyze" as used herein refers to both the increase of energy available for reactions and the introduction of compounds, molecules, elements, and other extractables that play at least some role in the maturation of a fluid and provide additional reactants that continue to drive reactions and development occurring in each of the heating and sonication stages.

Once the color extraction completes, the wood chips are automatically or manually removed from the AAS or partitioned away from the flowing beverage via a bypass to a second reaction chamber and/or a closing of the hose and/or pipe leading to a first reaction chamber. In one embodiment, a fluid level is lowered such that the fluid is not in contact with wood or wood chips. With the flavor, smell, and color compounds extracted in STAGE 1 and STAGE 2, the subsequent stages target development of these compounds for improved consumer taste and smell. In STAGE 3A of the illustrated embodiment, the spirit is subjected to ultrasonic waves without the presence of wood chips 113. Without the presence of wood, the cavitation bubbles form within the liquid itself. When the bubbles implode, the resulting extreme pressure and temperature change catalyzes and/or increases the energy available for the reactions occurring within the spirit. The development of at least four main groups of compounds are catalyzed and/or produced during the application of ultrasonic cavitation in STAGE 3: naturally occurring compounds within the alcohol, compounds extracted from the wood during STAGE 1, intermediate molecules derived from STAGE 2, and extracted molecules derived from STAGE 2. Among other products, this process is operable to, in one embodiment, produce esters that provide a complex taste and bouquet.

The ultrasonic cavitation process of STAGE 3A results in some loss of oxygen dissolved within the spirit 115. While oxygen loss is usually a positive side effect in other applications of ultrasonic cavitation, in spirit maturation, oxygen is ultimately needed to further develop the compounds contained in the beverage. The presence of oxygen further results in oxidation of several molecules, including volatile molecules that are produced during the distillation process. Thus, STAGE 3B includes aeration and gas infusion of the beverage and reintroduction of oxygen for reaction and integration with the processed beverage. In one embodiment, the beverage is aerated in ambient air, wherein the AAS is opened to the surrounding environment and the liquid allowed to interact with and absorb air molecules. In another embodiment, air is introduced to the liquid through active means, wherein ambient air or another gas (e.g., oxygen) is connected to the AAS through, for example, air hoses or compressed gas canisters. The pressurized gas is introduced to the AAS and allowed to react and dissolve within the spirit. Aeration occurs for enough time to introduce oxygen for catalyzing the reactions but minimize flavor loss. With limited exceptions, too much oxidation and/or too much evaporation due to aeration usually weakens whiskey beverages. However, controlled amounts are operable to enhance and result in the development of more complex flavors. Thus, aeration in this embodiment is designed to provide a customized amount of aeration time that by default minimizes flavor loss while still catalyzing and/or providing compounds and elements that drive the internal reactions.

The aeration process of STAGE 3B of the illustrated embodiment is conducted intermittently following a period of ultrasonic cavitation in STAGE 3A. Preferably, the process of ultrasonic cavitation is performed for approximately 15 minutes, and the aeration process is subsequently performed for at least approximately 1 minute or, in another embodiment, for at least approximately 5 minutes. In one embodiment, STAGE 3A and STAGE 3B are repeated for at least 24 times, for a total of approximately 6 hours and 24 minutes. In another embodiment, the spirit is processed through STAGE 3B coincidentally with STAGE 3A, where the combined processes occur in a separately attached container, for example the main reservoir, a second reaction chamber, or an aeration tank, in a similarly controlled manner. In an additional embodiment, the combined processes occur in the same container. Dissolved oxygen in a processed beverage is operable to significantly change flavors, aromas, and other sensory characteristics, as well as reduce negative side effects of alcoholic beverage consumption. In one embodiment, STAGE 3B and/or any other aeration or stage including the application of one or more gasses to a fluid are driven by sensor data from one or more sensors. For example, in one embodiment, aeration or the application of a gas continues until a determined level for dissolved oxygen is greater than or equal to a preset threshold.

STAGE 4 of the illustrated embodiment of the process is directed to a heat-based development of the spirit after sonication and aeration of STAGES 3A and 3B. The final heat-based process, which is conducted without the presence of wood, further catalyzes reactions involving intermediate molecules that have only been partially developed through the previous stages. Raising the process to a high temperature ensures that the activation energy for each reaction is met before the maturation is finished. The spirit is, in one embodiment, heated at a high temperature for approximately 48 hours. In another embodiment, the spirit is heated for between 24 and 72 hours. In a further embodiment, the spirit is heated for between 48 and 72 hours.

The combination of the processes disclosed in the above embodiments results in a spirit that is significantly improved in taste, smell, and color when compared to prior art accelerated aging processes. Significantly, the combination of these elements is a non-obvious improvement over the prior art and over each of the processes individually. The combination of sonication in the presence of wood before heat development and sonication not in the presence of wood results in a complex taste for a produced beverage. Processes that involve first sonicating without wood tend to develop some of the smoothness present within the unaged spirit, but the resulting taste is often lacking in complexity in comparison to a spirit first processed in the presence of wood, as the spirit only contains compounds naturally present in the distillate, and no other extracted compounds are present to develop. Likewise, simply heating a liquid without the presence of wood catalyzes some of the reactions within the spirit but does not impart the wood-based flavor that is necessary for most whiskey products. Simply performing sonication and/or heating in the presence of wood without further development also leads to an undesirable flavor, smell, and/or color of the aged spirit. Additionally, merely heating in the presence of wood chips without any additional processes leads to two problems: merely heating in the presence of wood chips creates an undesirable dilemma between developing color and flavor in a short period of time and leads to the over extraction of color in the pursuit of more flavor. This often results in a flavor that is simple and often characterized by only tasting of undeveloped wood or oak rather than more complex flavors, such as vanilla, fruit, smokiness, and/or other flavors characterizing mature spirits. In contrast, providing separate heating processes and sonication processes both in the presence of wood and not in the presence of wood allows for finer control over several sensory characteristics, including the extraction and development of the compounds that exhibit characteristics equivalent or similar to those of spirits aged for several years. The combination of the described processes results in a spirit with a desirable taste, smell, and color that is both balanced and easily customizable, wherein each process is operable to be adjusted in order to produce beverages with precise sensory characteristics. Notably, it is within the scope of this invention to repeat or add stages within this process to provide further customization, including stages for additional sonication, aeration, aeration at elevated temperatures, or heating. In an alternative embodiment, wood that has been previously used in STAGE 1 and STAGE 2 is reintroduced during the aeration stage for further flavor and color development.

Figure 1A:
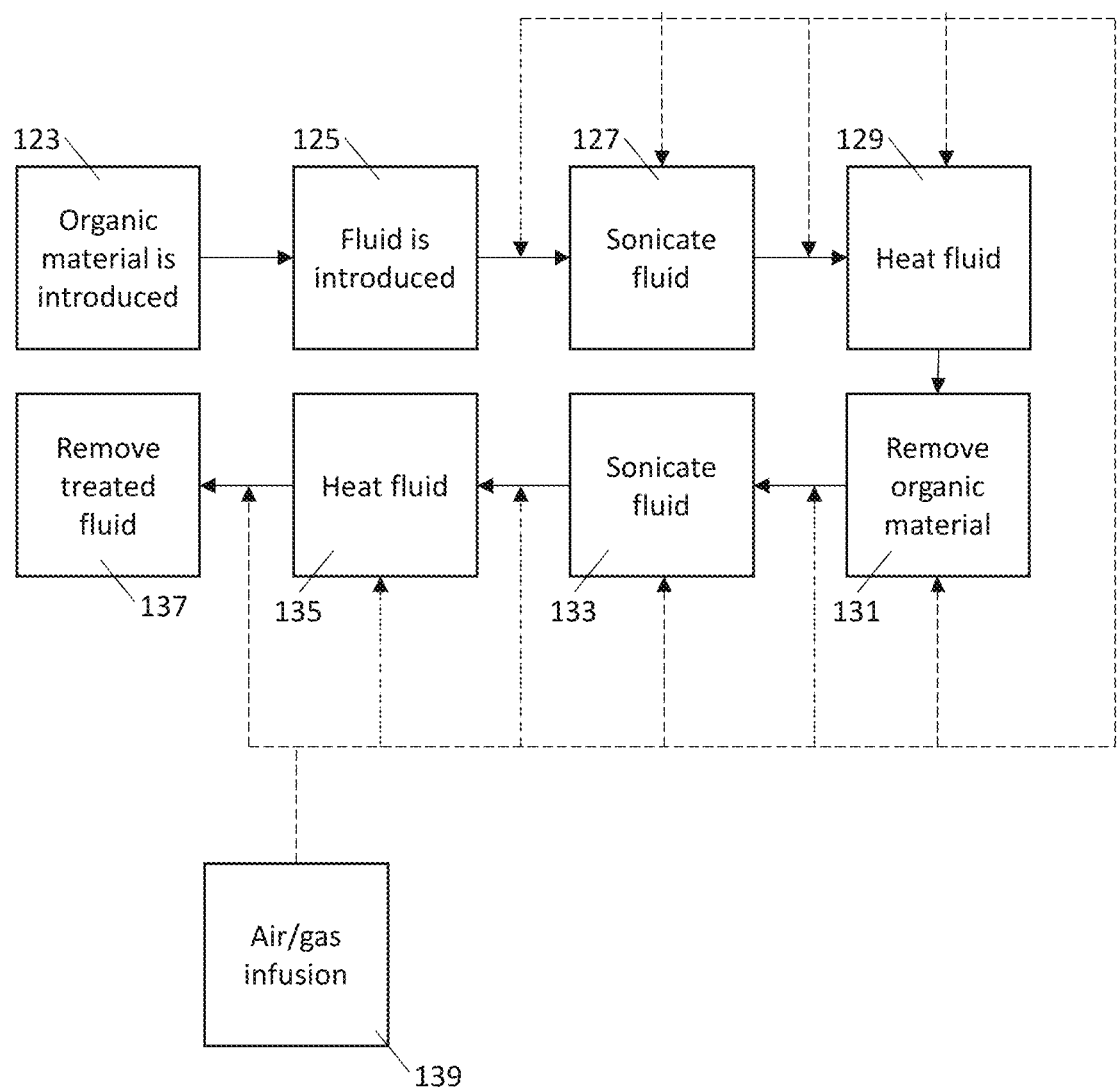
FIG. 1A illustrates a flowchart of an accelerated aging process with multiple gas infusion points according to one embodiment of the present invention.

FIG. 1A illustrates a process diagram for an aging process according to one embodiment of the present invention. Specifically, the illustrated process begins with organic material being introduced to the system 123, wherein the organic material is any organic material for flavoring, aroma, color, or other extraction or infusion, including wood, berries, nuts, cinnamon sticks, plants, or other processed or unprocessed food, such as chocolate. Following introduction of the organic material 123, fluid is introduced to the system 125, wherein the fluid is any edible or drinkable fluid, such as a distilled spirit (e.g., whiskey, vodka, rum), pre-distilled fluid (e.g., mash, wash, must, wort), or other beverage (e.g., coffee, tea, soda, water). The fluid is further sonicated 127, wherein ultrasonic energy is applied to the fluid (see FIGS. 2 and 2A for ranges and preferred embodiments of times, temperatures, power, and other parameters for each of these steps). The fluid is then heated for a preset amount of time 129, after which the organic material is removed 131. Next, the fluid is again sonicated 133 (with the organic material removed) and then heated 135. Once the fluid has been treated through each of these processes, it is removed from the system 137. In one embodiment, an air/gas infusion process 139 occurs at one or more points between or within each of the previous stages. For example, in one embodiment, the air/gas infusion 139 occurs before sonication with organic material 127, before heating with organic material 129, before sonication without organic material 133, before heating without organic material 135, and/or after heating without organic material 135. In a further embodiment, the air/gas infusion 139 is also further operable to occur during heating with organic material 129, during sonication without organic material 133, at paused intervals between the sonication without organic material 133, and/or during heating without organic material 135. In one embodiment, air/gas infusion occurs during any stage, between any stage, after any stage, or before any stage for a time between approximately 1 minute and approximately 2 hours. In another embodiment, the air/gas infusion occurs for at time between approximately 45 minutes and approximately 90 minutes. In a further embodiment, the air/gas infusion occurs for approximately 1 hour. The air/gas infusion occurs, in one embodiment, on approximately 0.2 L/min of the processed fluid. In one embodiment, the flow rate is between approximately 0.1 L/min and 5 L/min. In a further embodiment, the flow rate is between approximately 0.1 L/min and 1 L/min.

Figure 2:
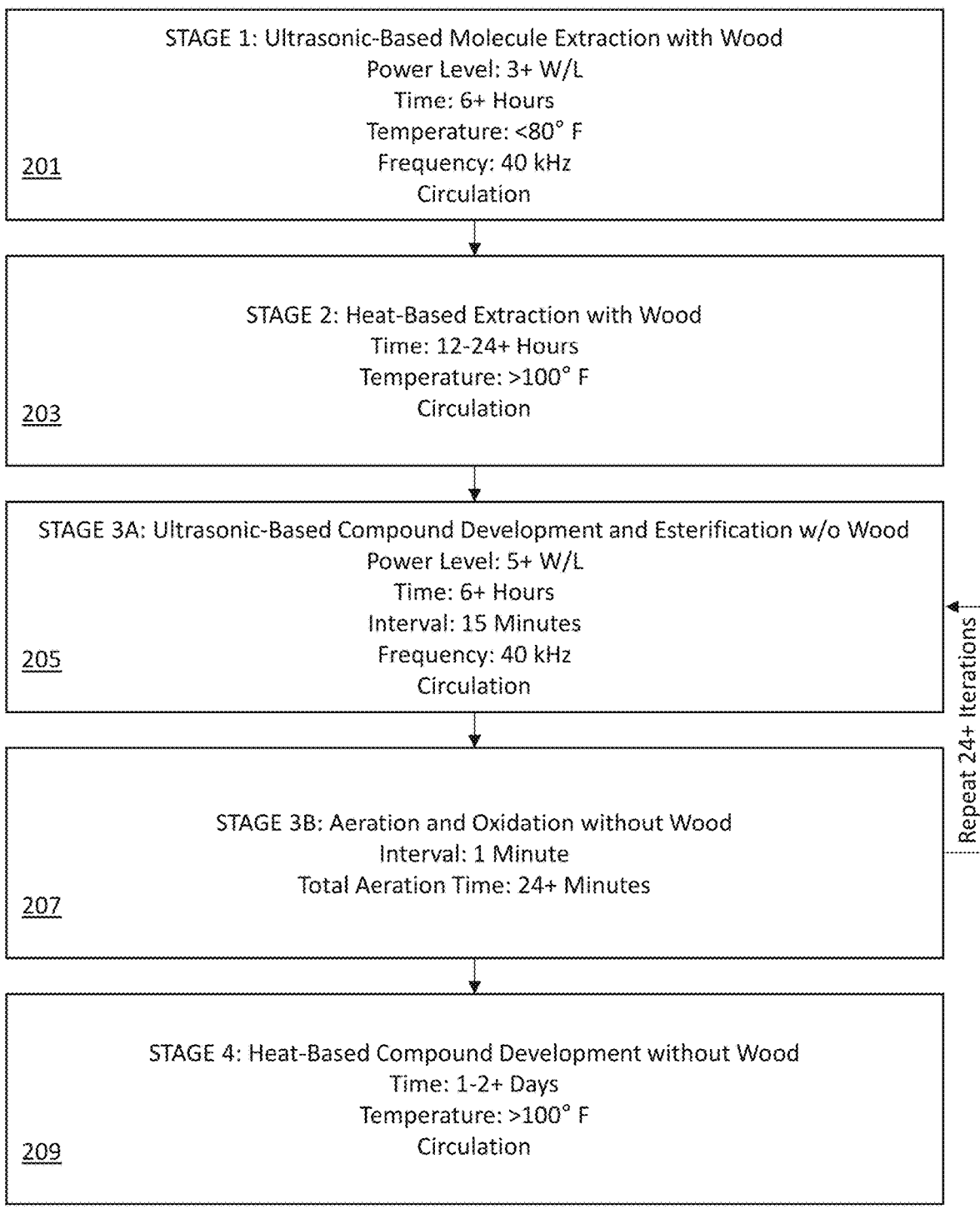
FIG. 2 illustrates a flowchart of parameters and levels of an accelerated aging process according to one embodiment of the present invention.

FIG. 2 illustrates one embodiment of specific ranges and parameters within which the present invention operates at each stage. These combinations of power, frequency, and maintained temperature at each stage of the process provide unexpected results that solve a long-felt, unmet need in the beverage industry. Whereas prior art focuses on performing a single-step color and flavor extraction, this embodiment of the present invention instead provides for modular control over extraction and development of flavor and aroma compounds as well as color and mouthfeel. The modular approach of this embodiment of the present invention, wherein the sonication and the heating are performed separately and at least one stage is performed with wood and at least one stage is performed without wood, results in a highly customizable, matured end-product. In STAGE 1 (201), the sonication process occurs with wood present. The ultrasonic transducers are operated in one embodiment with a power level of at least approximately 3 watts per liter. In another embodiment, the transducers operate between approximately 3 and approximately 15 watts per liter. In a further embodiment, the transducers operate with a power level of approximately 5 watts per liter. The frequency of the ultrasonic waves occurs, in one embodiment, between about 20 kHz and about 180 kHz. In one embodiment, the frequency is between about 20 kHz and 86 kHz. In another embodiment, the frequency is between about 35 kHz and about 45 kHz. In a further embodiment, the frequency is about 40 kHz. The spirit liquid is circulated while in the reservoir of the AAS or between one reservoir and at least one additional reservoir or reaction chamber, and the temperature is maintained between about 0° F. (7.22° C.) and about 85° F. (29.4° C.). In another embodiment, the temperature is maintained between about 45° F. (7.22° C.) and 85° F. (29.4° C.). In a further embodiment, the temperature is maintained between approximately 65° F. (18.3° C.) and 85° F. (29.4° C.). In yet another embodiment, the temperature is maintained between about 75° F. (23.9° C.) and about 80° F. (26.7° C.). Preferably, the temperature is less than about 85° F. (29.4° C.). In one embodiment, the spirit is sonicated in the presence of wood chips for approximately six (6) hours. In another embodiment, the spirit is sonicated between approximately four (4) and eight (8) hours. In on embodiment, ultrasonic frequency while sonicating in the presence of wood is lower than that of sonicating without wood, since lower frequencies generally promote the breakdown of organic material and extraction of compounds more than higher frequencies at the same power level. In one embodiment, STAGE 1 is performed at approximately 20 kHz, wherein STAGE 3 is performed at approximately 40 kHz. Alternatively, STAGE 1 and STAGE 3 are performed at any of the frequency ranges identified above, wherein STAGE 1 is performed at a frequency that is lower than that of STAGE 3.

In one embodiment, a processing temperature level is not limited in the production of specific sensory characteristics during sonication stages. Instead, the limiting factors of STAGE 1 are economic and physical, wherein excessively lower temperatures can add to production costs, and wherein lower temperatures require decreased pressure to maintain fluids and dissolved compounds in a processable state (i.e., above freezing points). Thus, in one embodiment, the cooling and set temperature in STAGE 1 is dependent upon a desired level of customization of specific sensory characteristics that occur at any temperature above approximately 32° F. (0° C.) and below the approximately 85° F. (29.4° C.) for any desired time and required pressure.

Furthermore, ultrasonic power and time provide a level of tradeoff, wherein high power and low amounts of processing time result, in at least one embodiment, in similar effects to that of low power and high amounts of processing time. Since practical and economic feasibility and desired sensory characteristics limit the power and time available for processing, power and time are balanced, in one embodiment, based on the disclosed ranges for STAGES 1 and 3.

Lower ultrasonic frequencies produce larger bubbles with greater energy, whereas higher ultrasonic frequencies produce much more bubbles with lower energy. The larger cavitation events associated with the larger bubbles is preferred during at least STAGE 1, as the larger cavitation events result in the extraction of more compounds from wood and other organic material than smaller cavitation events. Lower ultrasonic frequencies, in one embodiment, includes frequencies of between approximately 20 kHz and 80 kHz. In another embodiment, Lower frequencies include between approximately 20 kHz and 40 kHz.

Notably, the temperature maintained during the STAGE 1 (201) sonication process is a process that provides unexpected results to one of ordinary skill in the art. The low sonication temperature results in an extraction of compounds that are more difficult to extract and which do not get extracted in a high enough concentration during a high-temperature extraction process. This difference results in a flavor profile that is characterized by higher complexity and/or a more preferable flavor and aroma profile. Further, the separation of the compound extraction from the color extraction allows for fine control of both variables for an aged end product. These advantages are unexpected in the prior art and solve a long-felt and unmet need. For example, in U.S. application Ser. No. 10/234,973 to Tyler, now U.S. Pat. No. 7,063,867, filed on Sep. 4, 2002, the application and prosecution history of which is incorporated herein by reference in its entirety, the claims of the application are amended from "wherein said consumable alcohol is between about 70° F. and about 150° F. while the alcohol is being subjected to the ultrasonic energy," to recite, "wherein the alcohol is between 90° F. and 150° F. while the alcohol is being subjected to ultrasonic energy." In the Remarks accompanying the amendment, Tyler states, "In addition, the presently pending process claims require that the temperature of the beverage is held at a temperature between 90° F. and 150° F. during the sonication process. The inventors have discovered that the disclosed processes promote and accelerate the chemical reactions necessary to provide a consumable alcohol with the desired taste, clarity and aroma comparable to or even better than similar alcohols which have been processed via other maturation processes." Thus, Tyler teaches away from the application's originally recited range between 70° F. (21.1° C.) and 150° F. (65.6° C.). This remark by Tyler further indicates a preference towards higher temperatures during sonication in opposition to the low temperature ranges (i.e., less than approximately 85° F. (20.4° C.)) disclosed in this embodiment of STAGE 1 (201) of the present invention. Further, Tyler discloses in the issued patent, "Due to being subjected to the ultrasonic energy, the temperature of the alcohol can increase. It is believed that this is a beneficial side effect in that preferably the temperature of the alcohol can be maintained between about 90° F. (32.2° C.), and about 120° F. (48.9° C.), during the process." This explicitly teaches away from this disclosed embodiment of the present invention, wherein lower temperatures are utilized to extract compounds from organic material, such as wood, that cannot be extracted as efficiently at higher temperatures.

Circulation in every stage of the embodiment preferably occurs via a set of inlet and outlet hoses or pipes driven by at least one fluid transfer pump. In one embodiment, the flow rate of circulation is between 1 liter/minute and 100 liters/minute. In another embodiment, the flow rate is between 2.5 liters/minute and 25 liters/minute. In a yet another embodiment, the flow rate is approximately 7 liters/minute. In a further embodiment, the flow rate is approximately 20 liters/minute. In one embodiment, the flow rate is dependent upon and/or maintained by a pump speed, one or more valves, and/or one or more throttling mechanisms known in the art of fluid transfer. The fluid transfer pump is, in one embodiment, any pump known in the art of fluid transfer, including and/or referred to as a circulation pump, centrifugal pump, piston pump, rotary pump, hydraulic pump, positive displacement pump, diaphragm pump, or gear pump. The pump is operable to move fluids via any mechanical, physical, or chemical means, including via methods of pressure or gravity.

STAGE 2 (203), heat-based extraction with wood occurs over a longer period of time and extracts color from the wood while catalyzing some maturation of compounds within the spirit. Temperature is maintained at a point greater than approximately 100° F. (37.8° C.). In one embodiment, the temperature is maintained between approximately 100° F. (37.8° C.) and approximately 150° F. (65.6° C.). In a further embodiment, the temperature is maintained between approximately 100° F. (37.8° C.) and approximately 130° F. (54.4° C.). In a third embodiment, the temperature is maintained at approximately 110° F. (43.3° C.). The spirit is heated in the presence of wood for approximately 24 hours. In another embodiment, the spirit is heated for a time between approximately 12 and 36 hours. In one embodiment, the temperature level and processing time are not limited in the production of specific sensory characteristics. Instead, the limiting factors of STAGE 2 and STAGE 4 are economic and physical, wherein excessively higher temperatures and longer heating times can add to production costs, and wherein high temperatures require increased pressure to maintain fluids and dissolved compounds in a processable state (i.e., below boiling points). Thus, in one embodiment, the heating in STAGE 2 and STAGE 4 are dependent upon a desired level of customization of specific sensory characteristics that occur at any temperature above approximately 100° F. (37.8° C.) for any desired time and required pressure. Notably, the parameters and levels of this stage largely benefit extraction of color from wood for darker spirits, such as whiskey products, though other compounds are additionally extracted and developed in this process as well. Other, consumable beverages, including gin, while infused with extracted flavors, are generally clear. In one embodiment, the heat-based color extraction process occurs with an organic material for between approximately 0 and 48 hours, but in another embodiment occurs between 0 and 36 hours, to begin extraction and development of some compounds without extracting as great an amount color as would be extracted with longer processing times. In another embodiment, an amount of organic material is automatically or manually removed or reduced in STAGE 2 for color or other sensory characteristic purposes. In another embodiment, lower processing times, as described above, are used in the production of beverages using wood and other organic material that is repurposed (e.g., barrels formerly used in aging wine or other beverages) that impart different levels of flavor, aroma, color, and/or other characteristics. In one embodiment, a liquid is heated in the presence of wood or another organic material for approximately 5 hours, wherein the liquid is then filtered to remove color.

STAGE 3A (205), ultrasonic-based compound development and/or esterification not in the presence of wood, serves to develop extracted and existing compounds within the spirit and, in one embodiment, promote development of long chains of esters, which provide complex flavors and aromas in a finished spirit. In STAGE 3A (205), the ultrasonic cavitation occurs within the spirit itself instead of on the wood, as in STAGE 1 (201). In an alternative embodiment, the power level in STAGE 3A (205) is significantly higher than STAGE 1 (201). In one embodiment, the power level is between 1 and 15 watts per liter. In another embodiment, the power level is maintained at a constant level between 2 and 7 watts per liter. In a further embodiment, the power is approximately 3 watts per liter. In one embodiment, the frequency of the applied ultrasound is applied at a level of 20 kHz, 40 kHz, or 80 kHz. In another embodiment, the frequency of the applied ultrasound is any level between approximately 20 kHz and approximately 180 kHz. Preferably, circulation is maintained throughout this process to ensure an even distribution of the cavitation and maturation and/or to maintain an evenly mixed reaction volume. Notably, sonication of the spirit in this stage serves to both break down some compounds and catalyze development of other compounds. This novel and non-obvious combination of heat-based extraction and development with ultrasonic-based extraction and development results in a finished product that, in one embodiment, produces a beverage with a number of customizable characteristics that are similar to that of a variety of products aged through traditional, barrel-aging methods for between 1 year and 40 years. However, in another embodiment, due to the modular amount of customization available, the AAS is operable to produce beverages with unique sensory characteristics that are unattainable through traditional aging methods. These processes result in extracted and developed compounds that provide a taste, aroma, and color that was previously unavailable through prior art rapid aging technology. In addition, these processes provide for customization within a range of characteristic profiles to generate aged spirits that are both proprietary and resemble characteristics of traditionally aged spirits.

STAGE 3A (205) and STAGE 3B (207) are operated independently of each other. However, each step is repeated for a number of iterations until the spirit is sufficiently developed and ready for the heat-based maturation of STAGE 4 (209). In STAGE 3B (207), the spirit is aerated or oxidized without the presence of wood. Oxygen leads to the development and "opening" of many flavors in a spirit. Similar to wine, exposure to air results in both evaporation and oxidation, which when controlled leads to enhanced flavor profiles. In whiskey aging, oxygen is necessary for the formation of several complex chemical structures, including esters, a group of compounds that are often responsible for the floral and fruity flavors of an aged spirit. Oxygen is responsible for the oxidation of alcoholic compounds and other compounds within a spirit and the eventual production of esters. During traditional whiskey production, slow evaporation over long periods of time can lead to significant volume loss, known as the "Angel's Share," yet further results in the development and concentration of some desirable flavors. Aeration in the accelerated aging process allows for a minor and/or controlled amount of evaporation and a resulting concentration of the flavors in the spirit. Thus, oxygen and aeration plays at least some role in the development of a robust flavor and smell in whiskey beverages.

In one embodiment, aeration occurs through passive means, wherein the AAS is opened to the air directly or through a semi-permeable membrane, and the working fluid (e.g., the spirit or fluid being processed) is allowed to sit for a predetermined amount of time. Since temperature and humidity of a climate greatly affects an amount of oxygen that diffuses into a spirit and the resulting flavors, this provides each craftsman using the AAS a process to develop specific, location-based flavors that result from exposure to local conditions. Additionally or alternatively, aeration occurs through one or more active or passive means, including via paddlewheels, air compressors, pumps, diffusers, stones, turbines, or any other forced, agitation, or ambient introduction method known in the art. For example, in one embodiment, a semi-permeable membrane is used in conjunction with a vacuum pump to promote evaporation and removal of one or more molecules or molecule subsets present in the working fluid.

The spirit is, in one embodiment, aerated in a closed system to provide exact desired conditions for oxidation and development. For example, in one embodiment a hose is connected to the AAS, and oxygen or another air mixture is pumped into a reservoir containing the spirit, wherein the spirit is allowed to interact with the oxygen for a predetermined amount of time. The aeration system is operable to be a passive or active system, wherein in an active system air pressure, makeup, timing, and/or temperature is monitored and controlled. In a modular embodiment, the spirit is pumped and/or otherwise transferred into a separate aeration chamber, wherein a temperature, humidity, and oxygen content is monitored and highly regulated by the AAS based on rules and parameters set within the system. The AAS maintains constant pressure within the closed environment via one or more pressure and/or gaseous control systems, including an exhaust vent, an inlet, a valve, and/or any other active or passive method or system operable to utilize physical, mechanical, and/or electronic components to produce a pressure differential between the environment of the working fluid and an environment ambient to the AAS. The pressure is adjustable such that the amount of aeration occurring is operable to be adjusted by automatically or manually manipulating at least one parameter of the pressure control system. For example, in one embodiment, a valve is operable to open once a specific pressure has been reached. In another embodiment, a vent includes at least one rotating or sliding louver for adjusting the vent between a position that is between completely open and completely closed. In a further embodiment, pressure of an air inlet of the gaseous control system and/or the AAS generally is manipulated through one or more vacuum pumps or other pressure adjustment systems to introduce gas to the working fluid at a specific pressure and flow rate. Advantageously, the aeration control of STAGE 3B further allows for the AAS to provide a consistent product across a variety of climates and locations with varying humidities, atmospheric pressures, and temperatures.

Notably, while aeration and oxygenation are disclosed in the present invention, aeration in another embodiment includes the application, infusion, and/or treatment of a working fluid with any gas or combination of gasses and is not limited to an atmospheric mixture of gasses. For example, in one embodiment, the gas is any combination or pure application of nitrogen, oxygen, carbon dioxide, sulfur dioxide, or any gaseous variations known in the art of beverage production. Additionally, the AAS is not limited to a single gas while in operation. For example, in one embodiment, oxygenation is performed between STAGE 2 and STAGE 3, and sulfur dioxide is added after STAGE 4. In another embodiment, ambient aeration with atmospheric gas is performed in intervals during STAGE 3, and a gas with a high ratio of oxygen gas is introduced following STAGE 3.

Once aeration has completed, the spirit is sent back to STAGE 3A (205) for further sonication. The process of STAGE 3A (205) and STAGE 3B (207) is repeated for a pre-programmed and/or predetermined number of times in order to maintain appropriate oxygen and temperature levels to catalyze internal reactions at an optimal rate. In one embodiment, the process repeats between about 15 and 30 times. In another embodiment, the process repeats between about 22 and 26 times. In a preferred embodiment, the process is repeated for about 24 times.

Lastly, heat-based treatment of the beverage in STAGE 4 (209) catalyzes the development of esters and other compounds present within the spirit, many of which began to form in the earlier stages. In one embodiment, STAGE 4 (209) is conducted at a temperature greater than 100° F. (37.8° C.). In one embodiment, the temperature is between approximately 100° F. (37.8° C.) and approximately 150° F. (65.6° C.). In another embodiment, the temperature is between 100° F. (37.8° C.) and 120° F. (48.9° C.). In yet another embodiment, the temperature is between approximately 120° F. (48.9° C.) and 150° F. (65.6° C.). In a further embodiment, the temperature is maintained at approximately 110° F. (43.3° C.). Heat based development is the longest stage of the process, which preferably occurs for approximately two days. In one embodiment, the heating occurs between one day and three days. In another embodiment, heating occurs for 12 hours. In a preferred embodiment, circulation occurs during the heating process to provide an even maturation of the spirit.

In one embodiment, each step of the process is performed independently and sequentially. For example, each of the stages occur within a single processing unit, wherein hardware for each processing operation is built into a single tank or reservoir. In another embodiment, the system hardware is modular, wherein a tank or reservoir feeds to individual processing units for one or more stages of the aging process. In yet another embodiment, the system includes stages that operate both sequentially and simultaneously. For example, in one embodiment, STAGE 1 occurs at the same time as STAGE 2 in separate reaction chambers, and STAGES 3A, 3B, and 4 occur sequentially. Each processing unit is operable to connect to the modular system via manual or automatic transfer via pipes, plastic fluid lines, and/or a modular or moveable reservoir, wherein each system is operable to receive the modular or movable reservoir.

In alternative embodiments, the stages of the AAS are operable to be rearranged, wherein STAGE 1 and STAGE 2 are performed in opposite order. Similarly, STAGE 3A and STAGE 3B are alternatively performed in opposite order, wherein the beverage is aerated before sonication. In another embodiment, STAGE 4 occurs before STAGES 3A and 3B.

Figure 2A:
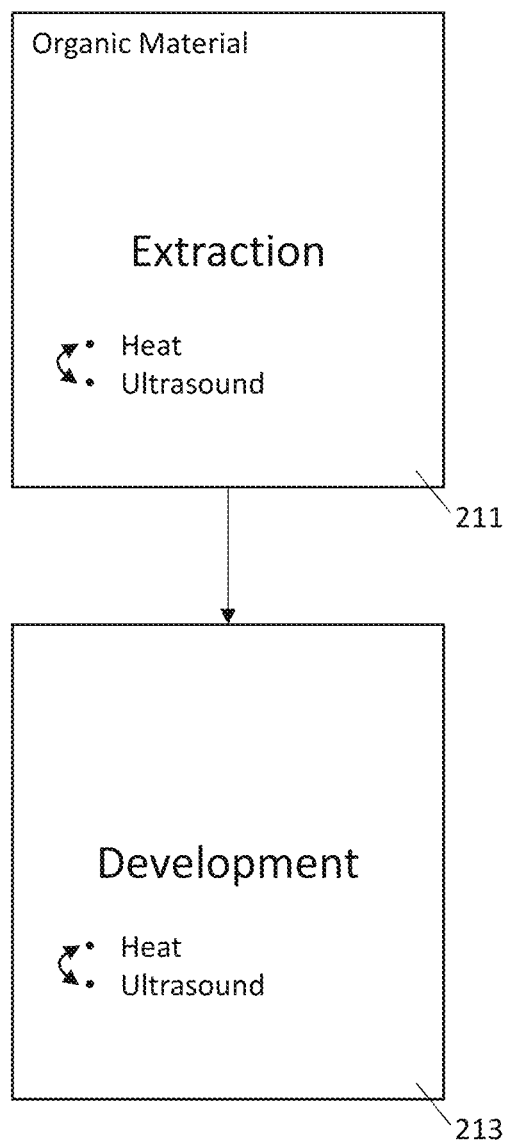
FIG. 2A illustrates a flow chart of an accelerated aging system wherein processes with organic material are performed before processes without organic material according to one embodiment of the present invention.

FIG. 2A illustrates a process diagram of an alternative embodiment for the AAS, wherein the processes are rearranged to target different use cases. The processes of FIG. 2A include an extraction process 211 and a development process 213, wherein the extraction process 211 includes heat-based extraction of compounds from organic material and ultrasonic-based extraction of compounds from the organic material. The heat-based extraction and the ultrasonic-based extraction are not limited by order in the illustrated embodiment, wherein in one embodiment the sonication occurs before the heating, and in another embodiment the heating occurs before the sonication. The development process 213 includes both heat-based development and ultrasonic-based development of compounds, in one embodiment, without the presence of organic material. The heat-based development and the ultrasonic-based development are not limited by order in the illustrated embodiment, wherein in one embodiment the sonication occurs before the heating, and in another embodiment the heating occurs before the sonication. Notably, the development, in one embodiment, breaks down compounds in addition to catalyzing formation of new compounds. The extraction, additionally, results in at least some break down and catalyzation of reactions.

In one embodiment, a main reservoir or tank is connected to one or more reaction chambers via an intake hose and an output hose, wherein each stage of the process occurs in the one or more reaction chambers and is returned to the main reservoir. Thus, the AAS is operable to treat smaller batches of a spirit at a time, leading to more efficient and consistent results for large volumes of product.

Except for an open aeration system within STAGE 3B, the AAS is preferably a closed system, wherein little to no fluid is lost in the aging process. In prior art systems, barrel aging results in a significant percentage of the alcohol evaporating (the "Angel's Share"). In contrast, the closed system embodiment provides for conservation of what would have traditionally been lost. Any amount that is lost during the aeration processes of STAGE 3B is highly controlled to develop specific tastes and scents, resulting in a significantly higher yield when compared to traditional aging processes.

Figure 11:
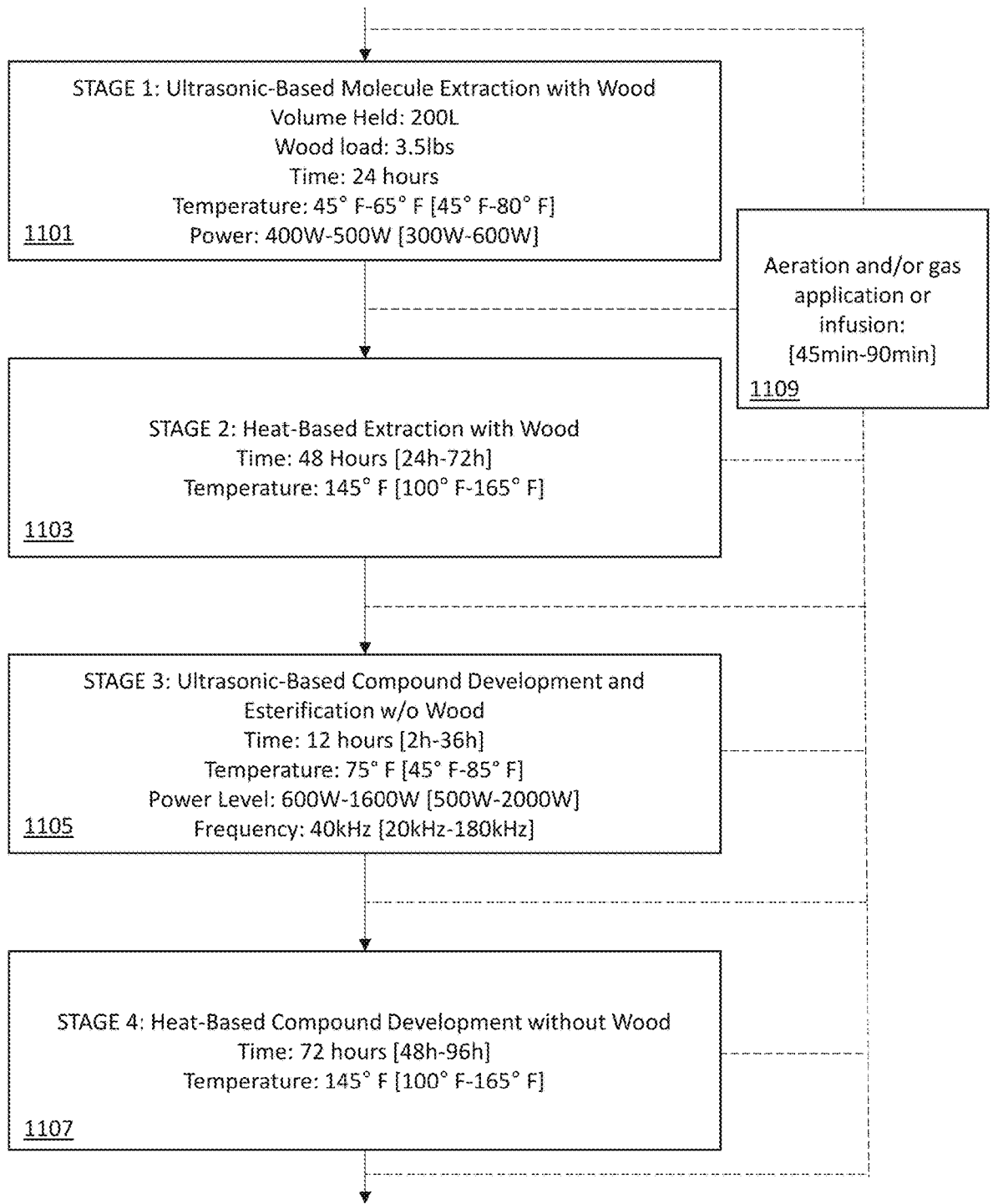
FIG. 11 illustrates a flowchart of an accelerated aging process with multiple aeration points and corresponding equipment parameters according to one embodiment of the present invention.

FIG. 11 illustrates another embodiment of the AAS, wherein the parameters match those required for producing craft-distillery scale volumes of aged spirits. In the illustrated embodiment, the AAS works with a main reservoir volume of 200 L. In one embodiment, the main reservoir is approximately 200 L and a reaction chamber is approximately 8 L. Alternatively, the main reservoir volume is approximately 900 mL. In one embodiment, a wood load of approximately 3.5 pounds by weight is introduced into the system as the organic material before STAGE 1 (1101). In another embodiment, the wood introduced is between 2 g/L and 20 g/L. In a further embodiment, the wood introduced is between 6 g/L and 12 g/L. In yet another embodiment, the wood introduced is between 6 g/L and 8 g/L. Notably, wood introduced at less than 0.5 g/L does not effectively produce changes in the taste, aroma, color, and other necessary characteristics of the AAS.

Processing the spirit in the presence of wood results in the extraction of different compounds depending on the temperature and presence of sonication. A controlled amount of these different compounds is extracted through AAS processing. STAGE 1 (1101) is focused on the extraction of compounds and tannins that do not occur at the same extraction rate through processing in any of the other stages. These compounds are extracted primarily by the breakdown of the wood by the powerful cavitation bubbles that form and implode on the wood itself during sonication in STAGE 1 (1101). The notable extraction rate in this stage of processing is due to the presence of sonication at low temperatures. In one embodiment, the spirit is sonicated at a power between 300 W and 600 W. In another embodiment, the spirit is sonicated at a power between 400 W and 1000 W. In a further embodiment, the spirit is sonicated at a power of approximately 500 W. Since the power required for each stage varies based on the volume of spirit, the amount of wood product, and the sonication time the AAS is operable to perform sonication based on an energy level setup or input. For example, in one embodiment, STAGE 1 operates between 6500 watt-hours and 8000 watt-hours. In a preferred embodiment, STAGE 1 operates at approximately 7200 watt-hours. Preferably, the sonication time is approximately 24 hours. However, in another embodiment, the sonication occurs for a time between 16 and 32 hours. Notably, the development of tannins is directly proportional to the amount of time the spirit is sonicated, where tannins directly contribute to a "harsh" mouth feeling at the beginning of an experienced mouthfeel.

The AAS is further operable to sonicate a working fluid based on a level of watt-hours per liter (Wh/L). In one embodiment, the AAS operates in STAGE 1 (1101) at a level of at least 5 Wh/L. In another embodiment, the sonication level in STAGE 1 (1101) is between 5 Wh/L and 30 Wh/L. In yet another embodiment, the sonication level in STAGE 1 (1101) is between approximately 5 Wh/L and 15 Wh/L. In another embodiment, the sonication level in STAGE 1 (1101) is between approximately 30 Wh/L and 60 Wh/L. In yet another embodiment, the sonication level in STAGE 1 (1101) is between approximately 30 Wh/L and 450 Wh/L. In a further embodiment, the sonication level in STAGE 1 (1101) is between approximately 50 Wh/L and 450 Wh/L. Advantageously, maintaining a level of sonication based on a level of watt-hours per liter allows for scalability, wherein the AAS is operable to maintain similar cavitation levels and extraction from organic material in both small-volume systems and large-volume systems.

In one embodiment, sonication of any organic material, such as wood, maximizes an amount of surface area of the organic material in contact with ultrasonic energy to improve the extraction of compounds from the organic material and/or promote breakdown of the organic material. For example, in one embodiment, multiple, lower powered ultrasonic transducers are applied across one or more sides of a rectangular reaction chamber to increase the amount of ultrasonic energy impacting the organic material. In another embodiment, sonicated surface area is increased by surrounding one or more transducers with the organic material. In a further embodiment, the ultrasonic energy is applied by a transducer that has one or more shapes that surround and/or penetrate a load of organic material. In another embodiment, the AAS includes one or more moving components to improve sonication area. For example, in one embodiment, one or more ultrasonic transducers are operable to spin and/or move along one or more reaction chambers and/or holding containers for organic material during sonication. In another embodiment, a holding container for the organic material is operable to move around or along one or more ultrasonic transducers.

Similar to the process described above, temperature is preferably maintained low, as this results in stronger implosion of cavitation bubbles, resulting in a different extraction than that produced by high-temperature cavitation. In one embodiment, the temperature is maintained between approximately 45° F. (7.22° C.) and 80° F. (26.7° C.). In another embodiment, the temperature is maintained between approximately 45° F. (7.22° C.) and 65° F. (18.3° C.). In a further embodiment, the temperature is maintained at approximately 65° F. (18.3° C.).

STAGE 2 (1103) occurs with the wood load still present in the reaction chamber. Whereas STAGE 1 (1101) is focused on compounds and molecules extracted at low temperatures, STAGE 2 (1103) is focused extraction and development of high-temperature compounds and molecules. The sonication is advantageously separated from the heat-based extraction and development, since sonicating at high temperatures poses a risk of over-extraction of tannins or extraction of flavors that are undesirable. In addition to the extraction and development of high-temperature extractives, the increased kinetic energy contributes to some color extraction and infusion as well as some intermediate compound development. Following completion of STAGE 1 (1101), the AAS is operable to heat the spirit according to one or more preset conditions. STAGE 2 (1103) preferably applies heat to the spirit in the presence of organic material. The heat both extracts compounds from the organic material as well as catalyzes some compound reaction and development, which contributes to overall sensory characteristics of the spirit. The time required for STAGE 2 is dependent upon both the maintained temperature, the wood amount, the spirit volume, and/or the ratio of wood amount to spirit volume. In one embodiment, the spirit is heated between 24 and 72 hours. In another embodiment, the spirit is heated between 24 and 48 hours. Preferably, the spirit is heated for approximately 48 hours. Notably, heating the spirit for less than approximately 24 hours results in a beverage with an underdeveloped aroma and taste, whereas increasing the heating time amplifies the intensity of the aroma and leads to a spirit with a taste that is similar to that of an aged spirit. Heating beyond 72 hours leads to minimal development of many of these characteristics. While color development is one of the primary goals of STAGE 2 (1103), it is highly dependent upon the temperature level, wherein a higher temperature allows for more color extraction and infusion than a lower temperature. However, heating for longer than 72 hours generally provides minimal difference in overall color extraction and infusion.

The temperature for STAGE 2 (1103) is higher than that of STAGE 1 (1101), wherein the spirit is heated to between approximately 100° F. (37.8° C.) and 165° F. (73.9° C.). In another embodiment, the spirit is heated to between approximately 145° F. (62.8° C.) and 165° F. (73.9° C.). In a preferred embodiment, the temperature is approximately 145° F. (62.8° C.).

In STAGE 3 (1105), the spirit is processed without the organic material present. Ultrasonic energy is applied to the spirit to both break down compounds and catalyze any esterification and constructive reactions. The sonication in STAGE 3 (1105) is directed toward driving reactions that require high reaction energy. The reactions are driven by the cavitation energy present, wherein the implosion of bubbles in this stage results in localized, extremely high temperatures and pressures. The energy applied to the spirit in STAGE 3 (1105) is higher than that applied during STAGE 1 (1101), as the process is intended to develop reactions with high reaction energy. In one embodiment, the spirit is sonicated at a power between 500 W and 2000 W. In another embodiment, the spirit is sonicated at a power between 600 W and 1600 W. In a preferred embodiment, the spirit is sonicated at approximately 1600 W. STAGE 3 (1105) includes, in one embodiment, a sonication time between 2 hours and 36 hours. In another embodiment, the sonication time is approximately 12 hours. Alternatively, the AAS applies an energy between 10 kWh and 15 kWh. In another embodiment, the AAS applies an energy between 11.5 kWh and 13.5 kWh. In a preferred embodiment, the AAS applies an energy of approximately 12.6 kWh. The frequency of the ultrasonic transducers in STAGE 3 (1105), in one embodiment, is at least approximately 20 kHz. In another embodiment, the frequency is between approximately 20 kHz and 180 kHz. In a further embodiment, the frequency is between approximately 85 kHz and 120 kHz. The frequency is, in one embodiment, constant throughout STAGE 3 (1105). In another embodiment, the frequency varies within STAGE 3 (1105), wherein, for example, the process begins at a high frequency of 120 kHz and decreases to 20 kHz for some of the processing time; or wherein, for example, the processes beings at a frequency of 28 kHz and increases to 180 kHz at some point in the processing stage. Preferably, the spirit is maintained at a set temperature during sonication to keep the cavitation and performance consistent during processing. In one embodiment, the temperature is maintained between 45° F. (7.22° C.) and 80° F. (26.7° C.). In another embodiment, the temperature is maintained between 65° F. (18.3° C.) and 85° F. (20.4° C.). In another embodiment, the spirit is maintained between approximately 75° F. (23.9° C.) and 150° F. (65.6° C.). Notably, over-sonication of the working fluid is capable of removing many flavors and aromas. For example, it has been found that this generally occurs if a working fluid undergoes STAGES 1 and 2 and is subsequently sonicated at a high power (e.g., multiple 40 kHz transducers operating in a 200 L embodiment at approximately 1500 W (approximately 900 watt-hours per liter) for 5 or more days.

The AAS is further operable to sonicate a working fluid based on a level of watt-hours per liter (Wh/L). In one embodiment, the AAS operates in STAGE 3 (1105) at a level of at least 5 Wh/L. In another embodiment, the sonication level in STAGE 3 (1105) is between 5 Wh/L and 30 Wh/L. In yet another embodiment, the sonication level in STAGE 3 (1105) is between approximately 7 Wh/L and 15 Wh/L. In another embodiment, the sonication level in STAGE 3 (1105) is between approximately 30 Wh/L and 60 Wh/L. In yet another embodiment, the sonication level in STAGE 3 (1105) is between approximately 30 Wh/L and 450 Wh/L. In a further embodiment, the sonication level in STAGE 3 (1105) is between approximately 50 Wh/L and 450 Wh/L.

STAGE 4 (1107) is intended to establish equilibrium of many of the longer chain esters and other compounds and improve overall taste and bouquet. Many compounds and reactions are underdeveloped or unfinished, and STAGE 4 (1107) provides a gentler processing method for driving this development. STAGE 4 (1107) is performed without organic material present and maintains heat between 100° F. (37.8° C.) and 165° F. (73.9° C.). In another embodiment, the temperature is between 125° F. (51.7° C.) and 165° F. (73.9° C.). In a further embodiment, the temperature is approximately 145° F. (62.8° C.). In one embodiment, STAGE 4 (1107) is performed for a time between 48 hours and 96 hours. In another embodiment, STAGE 4 (1107) is performed for a time between 72 hours and 96 hours. In a preferred embodiment, STAGE 4 (1107) is performed for approximately 72 hours. In an alternative embodiment, pressure is increased in a high-temperature embodiment during STAGE 4 (1107) in order to increase a boiling point of the working fluid. For example, in one embodiment the working fluid is an ethanol-containing fluid heated between approximately 165° F. (73.8° C.) and 240° F. (115.5° C.), wherein the pressure is increased to retain volatile compounds and ensure the fluid operable to be processed within the AAS. In one embodiment, the pressure of the system is increased such that the processed fluid is maintained at a temperature between 5° F. and 50° F. below the boiling point of any contained elements (e.g., ethanol, alcohol, water). In another embodiment, the fluid is maintained within 10° F. and 20° F. below the boiling points.

FIG. 11 further illustrates an aeration and/or gas application or infusion stage 1109. Aeration and/or gas application or infusion 1109 is any active or passive means of introducing a gas into a working fluid of the AAS. An aeration and/or gas infusion system is operable to supply atmospheric air, oxygen, nitrogen, carbon dioxide, or any other gas or mixtures therein for treating the working fluid. In one embodiment, application or infusion 1109 occurs during any stage, between any stage, after any stage, or before any stage for a time between approximately 1 minute and approximately 2 hours. In another embodiment, the application or infusion 1109 occurs for at time between approximately 45 minutes and approximately 90 minutes. In a further embodiment, the application or infusion 1109 occurs for approximately 1 hour. The application or infusion occurs, in one embodiment, on approximately 0.2 L/min of the infused gas. In one embodiment, the flow rate is between approximately 0.1 L/min and 5 L/min. In a further embodiment, the flow rate is between approximately 0.1 L/min and 1 L/min.

In an alternative, small-batch system, between 2 g and 20 g of wood are used, and preferably approximately 12 g. STAGE 1 occurs between 3 hours and 6 hours and preferably for 4 hours. Temperature is maintained between 45° F. (7.22° C.) and 80° F. (26.7° C.). Preferably, the temperature is approximately 65° F. (18.3° C.). Sonication during STAGE 1 is maintained between 50 W and 100 W and preferably is maintained at approximately at 60 W. STAGE 2 of the small-batch system is maintained at a temperature between approximately 120° F. (48.9° C.) and 180° F. (82.2° C.) and preferably at approximately 145° F. (62.8° C.). Processing at STAGE 2 is performed between approximately 24 and 72 hours and preferably for approximately 48 hours. STAGE 3 of the small-batch system occurs for between approximately 3 hours and 15 hours and preferably for approximately 9 hours. Temperature is maintained between approximately 45° F. (7.22° C.) and 85° F. (20.4° C.). In another embodiment, the temperature is maintained between 75° F. (23.9° C.) and 135° F. (57.2° C.). Sonication during STAGE 3 is maintained between approximately 90 W and 200 W and preferably is maintained at approximately 120 W. STAGE 4 of the small-batch system is maintained at a temperature between approximately 120° F. (48.9° C.) and 180° F. (82.2° C.) and preferably at approximately 145° F. (62.8° C.). Processing at STAGE 4 is performed between approximately 48 hours and 96 hours and preferably for approximately 72 hours.

STAGES 1-4 each affect individual characteristics in the maturation of a consumable beverage. While preferably each of the stages are performed to mature a beverage, and while in one embodiment the stages are performed in order, in an alternative embodiment, the stages are performed individually or in combination with one or more stages to target specific maturation characteristics in a working fluid. For example, in one embodiment, a whiskey product is sonicated via STAGE 1, heated via STAGE 2, and then barrel aged over time. When performed sequentially, at least the following benefits are derivable from each stage; however, individually each stage is operable to exhibit at least some of the benefits disclosed: STAGE 1, sonication at low temperatures with organic material, extracts tannins and compounds that are not easily extracted by simply processing at higher temperatures and are only effectively extracted once cell walls are broken down by the powerful cavitation explosions at low temperatures. STAGE 2, heating with organic material, effectively extracts a different set of compounds than STAGE 1, color from the organic material, and drives some amount of intermediate compound development by increasing the amount of available kinetic energy. STAGE 3, sonication without organic material, drives reactions with high reaction energy generated through cavitation. STAGE 4, heating without organic material, finishes processing by driving reactions and development by increasing the available kinetic energy through heat addition.

FIGS. 13A-13E illustrate tables for a variety of variables and their effects on spirit processed through STAGES 1-4, as described in reference to FIG. 2 and FIG. 11. Notably, while several sensory characteristics and relationships are described, the effects and relationships of the individual variables are not necessarily the only effects and relationships resulting from each of the processing stages. Furthermore, each of these effects and relationships are based in part on sequential ordering of the stages, as disclosed herein. Additional stages (e.g., gas infusion or aeration) and/or different orders of the stages result, in some embodiments, in modified effects and relationships. FIG. 13A illustrates the sensory characteristics that result from the material inputs for the AAS. As identified in FIG. 13A, a proof of a working fluid affects both the flavor intensity of a matured product as well as the type of compounds extracted from wood and other organic material. The initial proof of the unaged spirit has an important role in the final flavor intensity of the finished product, as the proof of many beverages, such as whiskey, are reduced to a specific proof after aging and processing. Usually, this reduction in proof occurs through the addition of water to the processed spirit. Since a processed spirit with a high proof will require more water to reach the desired bottle proof than a spirit processed with a low proof, the additional water required will consequently reduce a bottle-proofed spirit's flavor. Thus, increasing the initial working fluid proof has an inverse relationship with flavor intensity when the spirit is bottle-proofed. Additionally, higher proof fluids result in more alcohol-soluble compounds being extracted, and lower proof fluids result in less alcohol-soluble compounds being extracted. Thus, increasing a working fluid's proof changes the final product's flavor accordingly. Wood selection and wood toast/char level also results in varying characteristics of flavor and color. In addition, quantity of wood in a system results in varying color in a processed system. For example, selecting *Quercus alba*, or white oak will provide a different flavor and color profile for an aged spirit than *Quercus robur*, or European oak. TABLE 1 below identifies key tasting notes attributable to a selection of standard oak selections for whiskey aging. Wood char and toasting levels similarly affect strength and type of flavor and aroma imparted to a matured spirit, wherein higher char levels and toasting levels both allow for the formation of compounds that filter congeners when interacting with a working fluid and allow for the development of certain sugars from the wood that react with the working fluid during the maturation process. Lighter toasting levels typically produce fruitier flavors, whereas heavier toasts and charred wood typically produce sweet, candy-like flavors. In addition, increasing the wood char and toast amount increases the amount of color extracted from the wood.

TABLE 1

| Oak aging tasting notes | |
|---|---|
| *Quercas Alba* (White American Oak) | High in vanillin and oak lactones; Slow release of tannins; Vanilla, crème brûlèe, honey |
| *Quercus Frainetto* (Hungarian Oak) | Light tannins; Toasted vanilla, caramel, wood, spice |
| *Quercas Garryana* (Garry American Oak) | Dark and complex notes, molasses, clove, smoke, coffee grounds |
| *Quercas Mongolica* (Japanese Mizunara Oak) | High moisture content; Vanilla, honey, dried fruits, cloves |
| *Quercas Petraee* (Sessile European Oak) | High level of tannins; Dark and spicy notes, peppercorns, potpourri |
| *Quercas Robur* (Penduncate European Oak) | High level of tannins; Fruity notes; (Red-wine casks) Red fruit, berries, peach, Seville orange, apricot; (Sheery, Port, or Madeira casks) Resins, figs, fruit cake |

FIG. 12 illustrates a table with sensory characteristics associated with traditionally aged beverages. The AAS is operable, in one embodiment, to automatically or manually adjust parameters of one or more processing stages to match the sensory characteristics of a traditionally aged beverage. For example, in one embodiment, a time that heating in the presence of wood is increased to receive a rich amber color similar to that of bourbon. Notably, sensory characteristics of traditionally aged beverages vary significantly, even though some are aged with similar parameters (e.g., time or mash bill). This is largely due to the number of unique combinations of possible aging factors, including mash bill, aging time, environment, type of wood used, and newness of wood. Advantageously, the AAS is operable to provide a range of temperatures, sonication levels, gas infusion, processing times, and other parameters, as disclosed herein, that are highly customizable. This high level of parameter customizability allows for a finished product with a range of sensory characteristics, such as flavor, aroma, color, and mouthfeel, that are as similar to or as different from traditionally aged spirits as desired.

FIG. 13B illustrates sensory characteristics that result from variables associated with sonication of a spirit in the presence of organic material (e.g., STAGE 1 of FIG. 11). Time or watt-hours of sonication is directly proportional to the amount of wood compounds extracted. Longer times and higher watt-hours generally result in more compounds being extracted from the organic material. Temperature during sonication directly affects aroma and flavor types. Specifically, sonicating at high temperatures (defined as approximately 75° F. (23.9° C.)) results in bright, fruity flavors and aromas as well as acidic and acetone flavors and aromas; sonicating at low temperatures (defined as approximately 65° F. (18.3° C.)) results in darker flavors and aromas with notes of coffee and "roasty" or "toasty" flavors and aromas. However, sonicating at a temperature too high (above approximately 85° F. (20.4° C.)) results in the removal of desirable flavors and aromas as well as the introduction of non-desirable flavors and aromas, including solvent-like, over-extracted, and chemical-esque flavors and aromas.

FIG. 13C illustrates the effects of time and temperature on the process of heat-based treatment of a working fluid in the presence of organic material. Specifically, time of the heating process is logarithmically proportional to the color extraction and infusion within a spirit, such that heating beyond 72 hours generally results in minimal change to the overall color. While color intensity increases over time at a specific temperature, temperature is the variable (excluding toast/char level or amount of the wood) that has the most effect on the overall darkness and color saturation possible, as described below. Time of the process also has an effect on flavor and aroma, where both flavor and aroma require at least 24 hours of processing to result in the removal of flavors and aromas associated with unaged spirits. Both flavor and aroma intensity increase directly proportional to the processing time, wherein a longer heating process results in an increase in the aroma intensity. However, this increase does not necessarily change the flavors and aromas to different flavors and scents.

Temperature of the heating process has an effect on color development, aroma, and flavor. Though color development is directly influenced by time of the heating process, the temperature level directly affects the color saturation cap. For example, a spirit processed for 72 hours will have a darker and/or more saturated color when processed at a higher temperature than a lower temperature. Temperature also has an effect on flavor and aroma of a processed product, where a low temperature (generally defined as approximately 125° F. (51.7° C.)) results in a product with brighter flavors and aromas, including coffee, light red fruit, and acetone; a high temperature (generally defined as approximately 165° F. (73.9° C.)) results in a product with darker flavors and aromas, including dark chocolate, cherries, and coffee. Processing the spirit in the presence of organic material results in a spectrum of aromas including these points, which generally lead to "lighter" flavors and aromas at lower temperatures and "darker" flavors and aromas at higher temperatures.

FIG. 13D illustrates the effects of time and watt-hours on sonication not in the presence of organic material. Time of sonication or watt-hours of sonication in this stage is inversely proportional to harshness, wherein longer sonication times equate to less "biting" flavors and mouthfeel in a finished product.

FIG. 13E illustrates the effects of time and temperature on the process of heating without organic material. This process occurs, in one embodiment, at temperatures that are similar to that of the process described in FIG. 13B. However, due to the lack of organic material, the process has different effects on a finished product. Time has the largest effect on flavor and aroma intensity, which has a logarithmic relationship with total heating time. Heating the spirit for less than 24 hours generally results in an undeveloped flavors and aromas that are representative of the unprocessed, original spirit. Flavor profiles and aromas have the most positive benefits, or the development of flavors and aromas that are similar to that of traditionally aged spirits, between 48 hours and 120 hours. Flavor and aroma are also affected by temperature, wherein a low temperature (generally defined as approximately 125° F. (51.7° C.)) results in bright flavors and aromas, including notes of acetone and red fruit; whereas a high temperature (generally defined as approximately 165° F. (73.9° C.)) results in dark flavors and aromas, including notes of caramel and black fruit.

Figure 3:
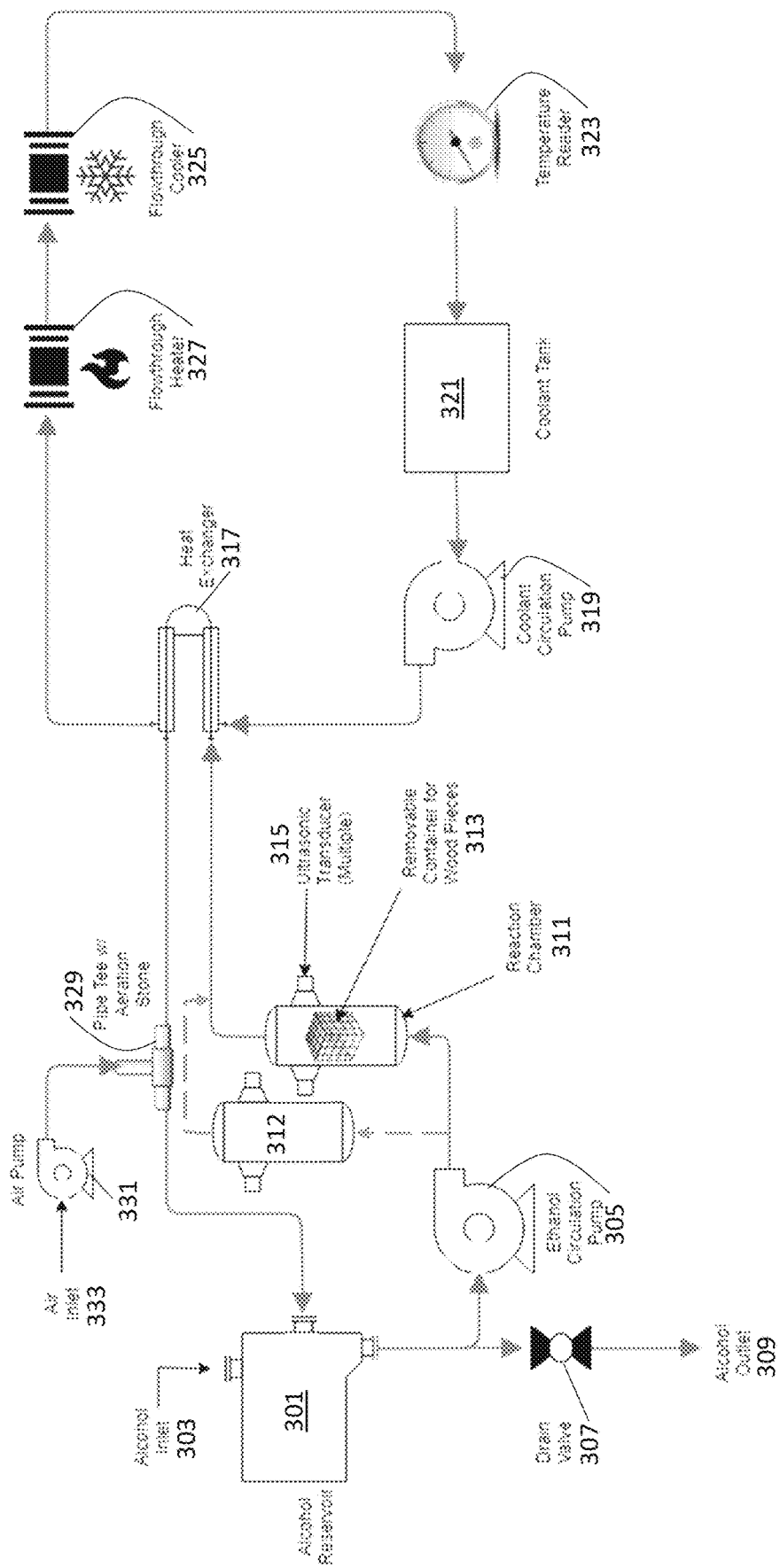
FIG. 3 illustrates a schematic of an accelerated aging system with dual reaction chambers according to one embodiment of the present invention.

FIG. 3 illustrates one modular embodiment of the AAS and the equipment used during the processes of present invention. The unaged spirit enters into an alcohol reservoir 301 of the AAS via an alcohol inlet 303. The alcohol reservoir 301 holds the spirit until it is manually or automatically released. The spirit exits the alcohol reservoir 301 via either a drain valve 307 leading to an alcohol outlet 309 or through a separate hose, pipe, or tube driven by the Ethanol Circulation Pump 305 (e.g., a fluid transfer pump). In one embodiment, the spirit enters and exits the system via the same port. The unaged spirit then enters at least one reaction chamber 311, within which at least STAGE 1 and STAGE 2 take place. An organic material is preferably added to the chamber via a removable container 313, such as a solid container and/or a mesh bag any other device or method that restrains the wood while allowing contact with the spirit. In an alternative embodiment, a barrier or a filter is integrated within the reaction chamber 311 and/or the removable container 313 to restrict any organic material from entering other parts of the system. During STAGE 1, ultrasonic transducers 315 produce ultrasonic waves within the at least one reaction chamber 311 and induce cavitation on the wood that is present. Preferably, at least two ultrasonic transducers are integrated into the AAS. In one embodiment, between 1 and 16 transducers are used during the sonication process. In another embodiment, between 1 and 64 transducers are used during the sonication process. In a further embodiment, between 16 and 64 transducers are used during the sonication process. In a yet another embodiment, the transducers are matingly attached to the reaction chamber 311 at opposite sides or ends. In one embodiment, multiple transducers are employed such that the power required for operation of each transducer is less than that required of one or more higher powered transducers. A combination of 16 transducers at 60 watts each allows for significant sonication without the need for a few high-powered and high-priced transducers that must operate at several hundred of watts, for example up to 1000 watts. For a reaction chamber 311, the ultrasonic transducers are attached along either side reaction chamber 311, wherein an intake and outlet lines are attached to at least one valve on ends of the reaction chamber 311, and wherein the fluid is sonicated along the length of the reaction chamber 311 as it flows from one end of the reaction chamber to the other. Alternatively, the ultrasonic transducers are attached to the ends of the reaction chamber and the intake and outlet lines are attached along the sides of the reaction chamber 311. In a further embodiment, the ultrasonic transducers are in direct contact with a working fluid, wherein one or more ultrasonic transducers are immersed within a fluid contained within a reaction chamber (311, 312). In another embodiment, the at least one ultrasonic transducer is connected to a tuned horn, which is immersed within a fluid contained within a reaction chamber (311, 312). In one embodiment, the reaction chamber 311 is a rectangular tube, wherein intake and outlet hoses are connected to either end of the reaction chamber 311 via an adapter (see FIGS. 4-6). In another embodiment, the reaction chamber 311 is a prism with more than four sides, wherein intake and outlet hoses are connected to any side of the reaction chamber 311 (including an end of the reaction chamber 311) via an adapter. For example, in some embodiments, a pentagonal prism, a hexagonal prism, or any other prism is employed, which allows for more flat faces for attaching transducers. In another embodiment, at least one second reaction chamber 312 is provided which bypasses the first reaction chamber 311. The secondary reaction chamber 312 is operable to be used for processing a working fluid without organic material such as STAGE 3A, STAGE 3B, and STAGE 4, while the first reaction chamber 311 includes wood 313 for processing during STAGE 1 and STAGE 2. In an alternative embodiment, the main reservoir 301 serves as the secondary reaction chamber, wherein at least STAGE 3A, STAGE 3B, and STAGE 4 occur.

In another embodiment, the main reservoir 301 serves as a single reaction chamber without the need for additional reaction chambers, wherein at least STAGE 1, STAGE 2, STAGE 3, STAGE 4, and/or any gas infusion stages occur in the main reservoir 301. In this embodiment, the main reservoir 301 holds the working fluid during all processing stages involving organic material (e.g., sonication in the presence of wood, heating in the presence of wood) before either the wood load is manually or automatically removed from contact with the working fluid, including through automatic or manual lowering of a liquid level via draining or via automatic or manual transferring of the liquid into another reservoir. This process serves to isolate the organic material from contacting the working fluid such that further processing is operable to occur without presence of organic material. In one embodiment of this system, the circulation or transfer pump is replaced with an agitator or other means of mixing the working fluid.

Figure 3A:
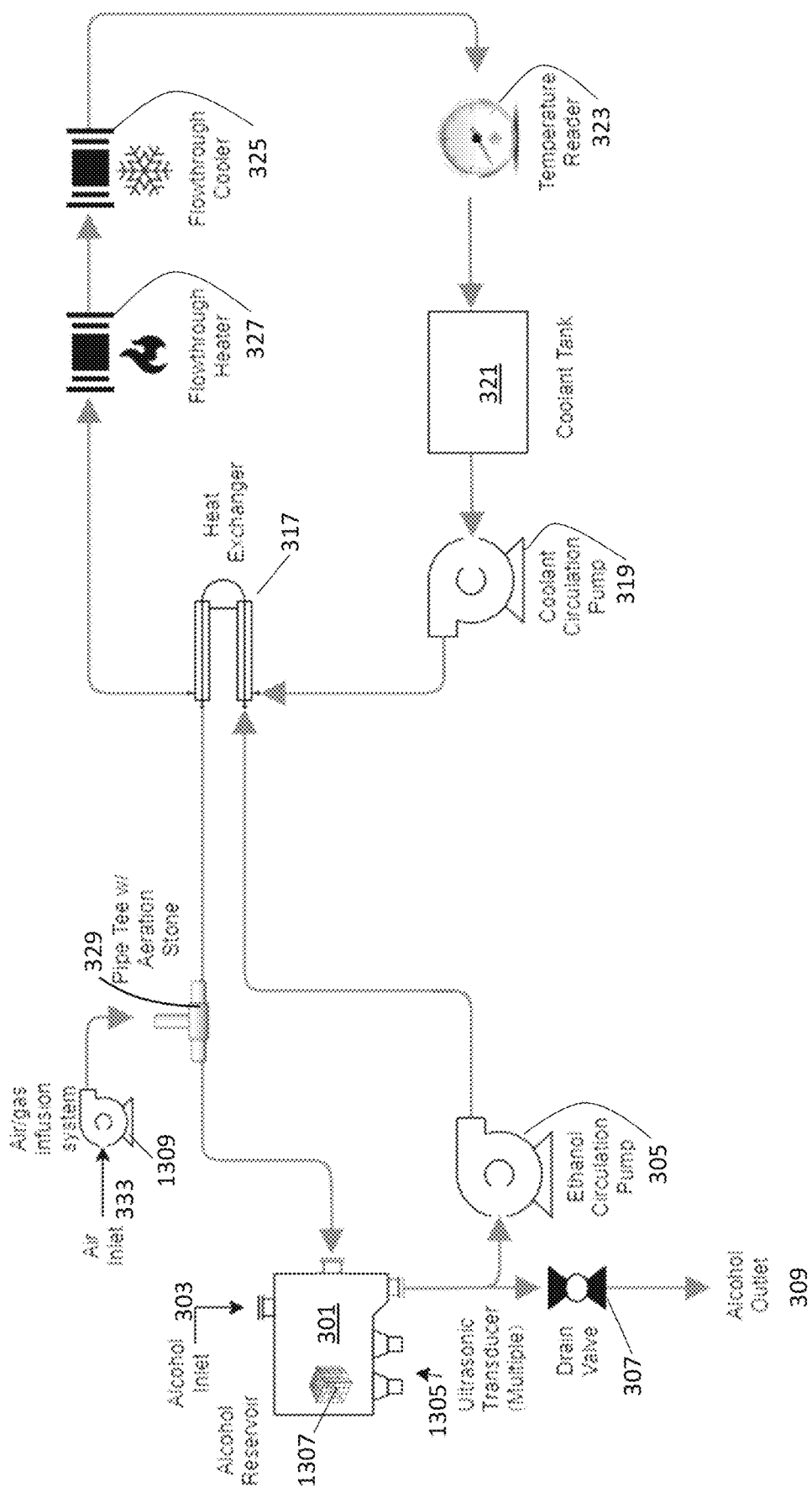
FIG. 3A illustrates a schematic of an accelerated aging system with a main reservoir reaction chamber according to one embodiment of the present invention.

FIG. 3A illustrates another embodiment of the AAS, wherein the main reservoir 301 serves as a single reaction chamber. In the illustrated embodiment, ultrasonic transducers 1305 are connected to the main reservoir 301 and are operable to sonicate the working fluid and a contained wood load 1307, wherein the wood load 1307 is contained with any similar holding mechanism disclosed herein for holding within a reaction chamber, including a mesh basket, bag, container, canister, tube, or other device operable to hold the wood load 1307 and allow both sonication and interaction with a working fluid. In one embodiment, the wood load 1307 is automatically or manually removed from the main reservoir 301 for stages that require treatment of the working fluid (e.g., via sonication, heat, or gas infusion) without the presence of organic material. Notably, the system includes an air/gas infusion system 1309, wherein the air/gas infusion system 1309 is operable to treat, infuse, and/or inject a gas to a working fluid via any active or passive means, as disclosed herein, including, for example, injecting oxygen, nitrogen, atmospheric air and/or other gas into the working fluid and/or passively exposing the working fluid to a gas, including atmospheric gas or other combination of gasses, via, for example, a vent or paddle wheel. In one embodiment, the air/gas infusion system 1309 is applied via pipe tee with an aeration stone 329. In another embodiment, the air infusion system 1309 directly applies air/gas to the working fluid in line, in the main reservoir, or in a reaction chamber.

In one embodiment, a reaction chamber, in coordination with one or more fluid transfer pumps, is operable to automatically fill and/or drain between processing, during processing, or after processing. For example, in one embodiment, the AAS includes one or more computer systems including a control system, wherein the control system is operable to automatically activate pumps, open or close valves, activate or deactivate heating and sonication systems, and generally control processing of the fluid in the AAS based on preset variable levels (e.g., time and temperature) and/or based on received sensor data. In one embodiment, a pump continuously operates to continuously process and treat fluid through a reaction chamber. In another embodiment, the fluid is transferred to a reaction chamber, wherein the fluid is treated, and wherein after a preset amount of time and/or based on received sensor data, the fluid is transferred from the reaction chamber.

In one embodiment, two or more reaction chambers process varying volumes of working fluid in order to effectively apply any energy needed to produce cavitation. In one embodiment, a smaller chamber is used to induce cavitation with a low-power transducer that would not be as effective at higher volumes. Additionally, in another embodiment, a larger chamber is used to induce cavitation with a high-power transducer to achieve different characteristic results from a processed fluid. For example, in one embodiment, sonicating 100 liters of an unaged spirit at 10 watts per liter requires at least 1000 watts of ultrasonic energy. Providing a reaction chamber with a 25 liter volume thus drops the required power level to 250 watts. When done in a flow-through or staged manner, sonicating a 100 liter tank with a reaction chamber requires less ultrasonic power than sonicating the whole tank at once.

In another embodiment, at least two reaction chambers are used, wherein the watt-density for sonication-based compound development differs between the at least two reaction chambers. For example, in one embodiment, different sized reaction chambers are paired with the same or similar amounts of sonication energy to provide differing watt-densities. Low watt-density reactors are operable to gently catalyze reaction by spreading cavitation reactions across a larger volume of product at a time instead of higher watt-densities at higher volumes. For example, if high watt-density reaction chambers harm the formation of certain desired compounds for a specific product, a low watt-density reaction chamber is operable to ensure greater formation of the desired compounds. In one embodiment, a single reaction chamber acts as both a high watt-density reaction chamber and a low watt-density reaction chamber by increasing an amount of sonication energy in the reaction chamber. In another embodiment, an AAS includes separate high watt-density reaction chambers and low watt-density reaction chambers, wherein processing occurs sequentially or simultaneously.

In one embodiment, the reaction chamber advantageously has a smaller cross sectional area combined with a longer length compared to traditional sonication setups, wherein the cross sectional area is approximately 16 inches$^2$ (103.226 centimeters$^2$). In another embodiment, the cross sectional area is approximately 49 inches$^2$ (316.128 centimeters$^2$). This construction provides for more surface area of an organic material to come into contact with the liquid, resulting in greater extraction of compounds and color during both STAGE 1 and STAGE 2 of processing.

In alternative embodiments, the AAS includes one or more additional reaction chambers. For example, in one embodiment, each of at least two reaction chambers are connected to the main tank via an intake hose and an outlet hose. At least one first reaction chamber includes an organic aging material, e.g., wood chips, and a second reaction chamber does not include the organic material. The AAS is operable to open and close valves leading from the main reservoir to each of the two reaction chambers according to a stage of the aging process. For example, STAGES 1 and 2 occur in the first reaction chamber in the presence of wood, whereupon valves to the first reaction chamber are manually or automatically closed and valves to the second reaction chamber are opened. The spirit is then directed to the second reaction chamber for processing in STAGES 3A, 3B, and 4. In another embodiment, the system includes one reaction chamber for each of STAGES 1, 2, 3, and 4, wherein each of the reaction chambers include sonication and/or temperature control systems necessary for each processing stage. Notably, in one embodiment, stages including the application of heat, such as STAGE 2 and STAGE 4, are not limited to extraction, reactions, and development only in a reaction chamber, since, in one embodiment, a whole of the volume is heated, resulting in continuous processing of the heated spirit throughout the process. This results in heat-based processing that is independent of a specific location of the working fluid in the AAS. In a further embodiment, the system includes multiple reaction chambers, such as five or more reaction chambers for parallel or series batch processing. In yet another embodiment, each reaction chamber includes a secondary reservoir for processing the spirit.

Alternatively, residual heat from one or more stages are passively utilized to process a working fluid. For example, in one embodiment, ultrasonic energy is applied to the working fluid to increase a temperature of the working fluid, and the spirit is allowed to rest for a time period without sonication. During the resting period, the heat allows for extraction, development, and/or reactions to occur similar to active heating embodiments. In another embodiment, one or more TCSs are operable to produce a temperature range that is ideal for a sonication stage at the end of a heating stage or during a heating stage to allow for seamless transition to a sonication stage.

The AAS, in one embodiment, has a capacity of at least 100 liters. In one embodiment, the capacity is between 100 liters and 10,000 liters. In another embodiment, the capacity is between 100 liters and 2,000 liters. In a further embodiment, the capacity is expandable, wherein the reservoir is replaceable with any sized tank. In one embodiment, a reaction chamber holds between 5 liters and 10,000 liters. In another embodiment, the reaction chamber holds between 5 liters and 500 liters. In a further embodiment, the reaction chamber holds between 5 liters and 200 liters. In one embodiment, the reservoir 301 is connected to the reaction chamber 311 and the beverage is processed in a flow-through manner. Specifically, each of the processing stages occur in a continuous manner and are performed on smaller batches drawn from the reservoir into the reaction chamber. In a further embodiment, the system operates in a staged manner, wherein a small batch of liquid is processed in the reaction chamber, wherein upon completion of one or more processes the batch is transferred to a separate tank or reservoir or is returned to the main tank or reservoir.

In one embodiment, a main reservoir operates as a reaction chamber. For example, a main reservoir is connected to at least one second reaction chamber and at least one bypass line, wherein the at least one second reaction chamber includes organic material. Upon completion of processes that require organic material to be present, a valve is redirected and/or closed such that fluid is directed away from the at least one second reaction chamber and is directed through the at least one bypass line. Further heating and/or sonication stages are performed within the main reservoir directly (e.g., a TCS and/or ultrasonic transducers are attached to the main reservoir) and/or are performed within at least one additional reaction chamber attached to the at least one bypass line. The system is further operable to reopen valves or redirect fluid back to the at least one second reaction chamber containing organic material if additional processing stages involving organic material are required based on user input, sensor feedback, or a predetermined number of cycles.

For heating and cooling operations, the spirit is preferably temperature controlled via one or more heat exchangers 317 and/or another indirect heat transfer method. Since alcoholic products are highly flammable, direct heating of the spirit is not preferred. Keeping a closed, non-mixing system of temperature control minimizes risk of dangerous conditions or explosion while performing the aging process. Preferably, a shell-and-tube heat exchanger is used. However, it is within the scope of this invention to use any heat exchanger known in the art of heat transfer and alcoholic beverage production. FIG. 3 illustrates one embodiment of the Temperature Control System (TCS), wherein a refrigerant or other fluid is employed to heat or cool the spirit. The TCS includes a circulation pump 319, which keeps a constant flow of a fluid through the system. A tank 321 holds the fluid when not in use. In one embodiment, the fluid is water, including treated, purified, and/or distilled water. In another embodiment, the fluid is any type or mixture (e.g., a glycol/water mixture) that is operable to efficiently heat and/or cool the spirit via the heat exchanger 317, including R-134a, R-32, ethylene glycol, propylene glycol, or antifreeze. A flow-through cooler 325 and a flow-through heater 327 are integrated within the TCS and maintain a constant fluid temperature within the TCS. A temperature reader 323 allows for automatic or manual monitoring of the temperature throughout the system by the flow-through heater 327, flow-through cooler 325, or another control system for the TCS or AAS. Preferably, the flow-through heater 327 and the flow-through cooler 325 are each attached to a digital control system, which monitors a temperature of the temperature control fluid as well as a temperature of the spirit flowing through the heat exchanger 317. In one embodiment, the flow-through heater 327 and the flow-through cooler 325 are separate parts of the temperature control system, wherein a heating system and a cooling system have different fluids (e.g., the heating system includes antifreeze and the cooling system includes R-134a). One or more heat exchangers are attached to each of the heating and cooling systems and enable heat transfer between the spirit and each of the systems for cooling or heating. In one embodiment, the heating system operates off vapor, such as steam.

The heat exchanger 317 and the TCS is operable to be an independent system, wherein the spirit is transferred from the reaction chamber 311 to a reservoir or directly into the heat exchanger. Preferably, however, the reaction chamber 311 provides an outlet line to the heat exchanger 317, wherein the spirit is pumped (via the ethanol circulation pump 305, the air pump 331, or a separate, dedicated pump for STAGE 3A and STAGE 3B) through the heat exchanger and back into the reaction chamber 311 or main reservoir 301. Alternatively, the heat exchanger includes an outlet line that is in direct contact with a reaction chamber 311, a main reservoir 301, or the contained fluid directly. For example, in one embodiment, both a silicone rubber heater and a glycol-based chiller is in direct contact with the main reservoir 301, the reaction chamber, or one or more lines of the AAS. In contrast to the prior art, the TCS of the present invention provides for both heating and cooling operations to maintain a precise temperature at each stage of the process. While some prior art methods include a heat exchanger, including U.S. patent application Ser. No. 15/966,843 ("Mancosky"), filed on Apr. 30, 2018, which is incorporated herein by reference in its entirety, and which includes a heat exchanger, wherein "after treatment in the reactor 18, the liquid flows through conduit 21 and may flow through a heat exchanger 22 to remove unwanted heat induced by the energy of cavitation." Mancosky, para [0025]. In contrast to Mancosky, this embodiment of the present invention is directed to using a heat exchanger or other indirect temperature control method to both maintain a specific, low temperature during each appropriate phase of the cycle as well as actively increase and maintain a high temperature during the heating stages. The heat exchanger is not merely a cooling operation performed in the period following sonication or other processes.

In one embodiment, the TCS is operable to be attached to an existing water or heat exchanger system. For example, in many distilleries and breweries, water is often used for other production systems in the distilling processes. The AAS is operable to link to the existing water system via the TCS or a separate attachment mechanism, wherein the water from the existing system is recycled, redirected, and/or heated and/or cooled for aging operations. Notably, the reuse of cooled or heated water results in less cooling or heating operations from the AAS.

In one embodiment of the aeration system, the aeration occurs in the reaction chamber 311. However, in another embodiment, the spirit is aged in a dedicated aeration chamber, reservoir, or other system that is either directly connected to the AAS or is located remote from the AAS. Aeration occurs via a pipe tee 329 including an aeration stone, wherein the pipe tee is connected to the reaction chamber 313 (or another reservoir holding the spirit) and an air pump 331. The air pump 311 draws air from an air inlet 333 and sends air to the spirit. In one embodiment, the air is ambient air external to the AAS. In another embodiment, near-pure oxygen (a mixture that is greater than 90% oxygen) is pumped into the spirit. The pipe tee 329 is further operable to be connected to one or more additional lines for directing air to multiple entry points within the reservoir or reaction chamber 311 or along an intake or outlet hose. In another embodiment, additional gasses are used, including carbon dioxide or nitrogen, or any ratio of carbon dioxide, nitrogen, oxygen, or atmospheric air. Notably, in one embodiment, the air pump 331 is any air/gas infusion system, wherein the air/gas infusion system is operable to actively or passively supply any gas to the working fluid in any manner disclosed herein, including, for example, injecting oxygen, nitrogen, atmospheric air and/or other gas into the working fluid and/or passively exposing the working fluid to a gas, including atmospheric gas or other combination of gasses, via a vent or paddle wheel. In another embodiment, the air/gas infusion system directly applies air/gas to the working fluid in line, in the main reservoir, or in a reaction chamber.

In one alternative embodiment, once the spirit has been aerated, it is returned to STAGE 3A, wherein the spirit is either transferred from a STAGE 3B reservoir to a STAGE 3A reservoir or it is held in the same reaction chamber 311 or reservoir of STAGE 3B. This transfer occurs for a preset number of times according to a control system for the AAS. Upon completion of STAGE 3B for the final time, the spirit is returned to the heat exchanger 317, kept in the reaction chamber 311, or transferred to a second heat exchanger for heating during STAGE 4. In one embodiment, the heat exchanger 317 is operably connected to the secondary reservoir or the reaction chamber 311 for heating during STAGE 3.

Upon completion of each stage in the AAS process, the aged spirit is, in one embodiment, returned completely to the alcohol reservoir 301. In one embodiment, if the spirit is not fully aged to a preset or desired level, the spirit again begins the process with STAGE 1 and is manually or automatically repeated for a preset or desired number of interactions. In another embodiment, the AAS is connected to one or more external tanks, reservoirs, barrels, or other systems, such that the processed fluid is automatically or manually transferred to the external systems upon completion.

In one embodiment, the AAS is operable to automatically add one or more materials to a processed liquid. For example, in one embodiment, the AAS is operable to reduce the proof of a processed alcoholic beverage by automatically adding water to reservoir containing a finished batch. In another embodiment, the AAS is operable to add flavorants or other additional solid or liquid additives, such as spices, extracts, or organic materials, to a spirit before processing, during processing, and/or after processing is complete. The AAS further is operable to adjust an amount of added substances based on sensor data, such as fluid volume, alcohol concentration, etc.

In one embodiment, filtration is added before, between, or after any of the aging stages. For example, in one embodiment, before the unaged spirit enters STAGE 1, it is circulated, pumped, and/or allowed to sit in a charcoal filter, which removes many impurities and certain flavor compounds from the whiskey. This process emulates many of the practices surrounding the "Lincoln County Process," which is often employed in the production of Tennessee Whiskey and usually involves filtration through a charcoal filter before aging.

Figure 14:
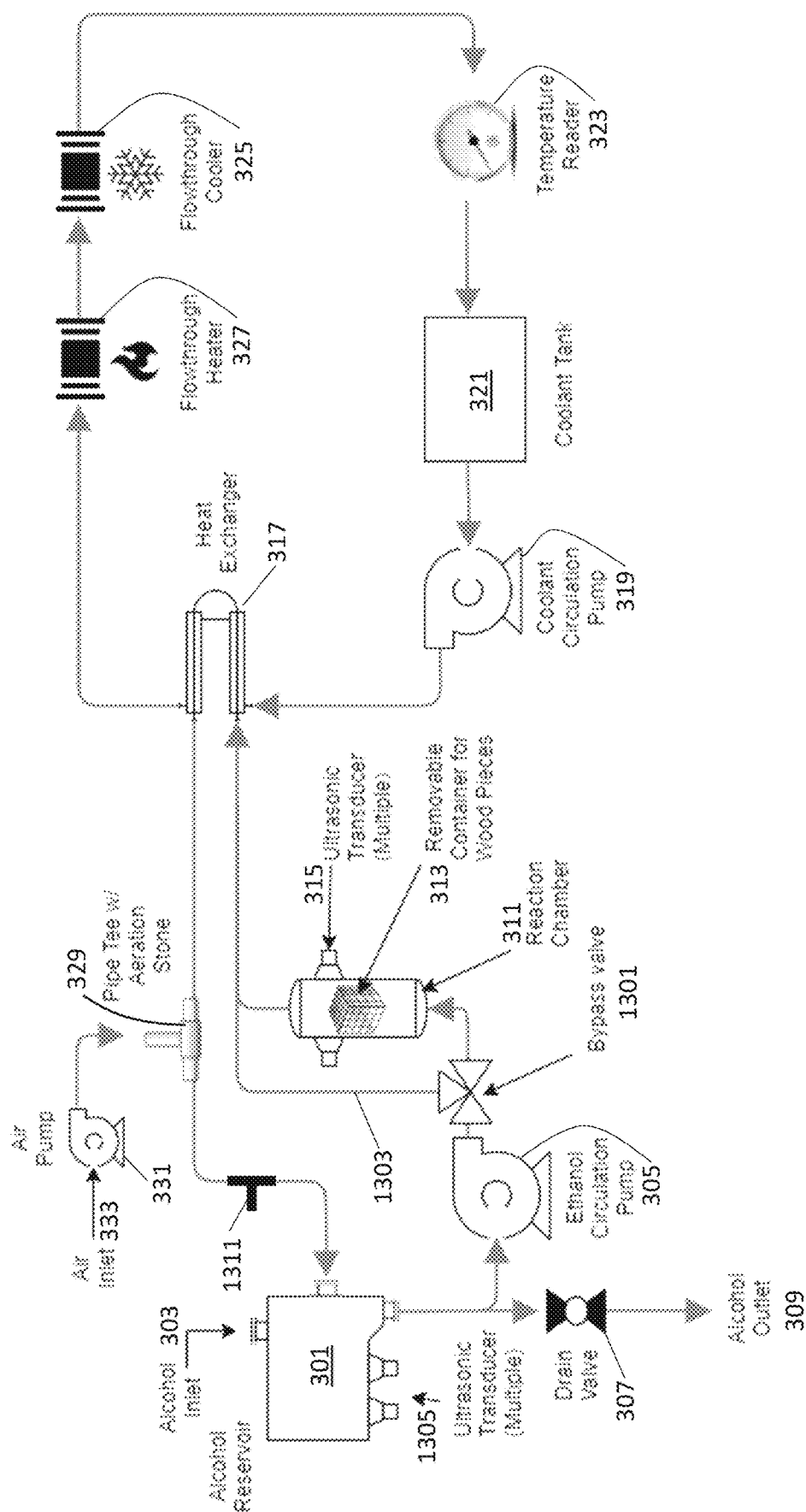
FIG. 14 illustrates a schematic of an accelerated aging system with a bypass line according to one embodiment of the present invention.

FIG. 14 illustrates a schematic of another embodiment of the AAS, wherein the AAS includes a bypass valve 1301 and a bypass line 1303. In one embodiment, the bypass valve is operable to redirect a processing line such that fluid enters the bypass line 1303 instead of the reaction chamber 311. In another embodiment, the bypass valve is operable to flow through both the reaction chamber 311 and the bypass line 1303. The bypass valve 1301 allows for fluid to be redirected from a reaction chamber 311 that holds organic material 313. For example, in one embodiment, the bypass valve 1301 automatically or manually redirects flow away from the reaction chamber 311 before stages that require sonication and heating without the presence of wood, such as STAGE 3 and STAGE 4, as described above. In this embodiment, secondary ultrasonic transducers 1305 are operable to be connected to the main reservoir 301 such that the main reservoir 301 serves as a second reaction chamber for sonication. Notably, in this embodiment, the bypass is similarly connected to the heat exchanger 317 and/or a TCS in general to temperature control and treat the working fluid. FIG. 14 further illustrates at least one port 1311, wherein the port 1311 is operable to be an inlet, outlet, or exhaust port, through which fluid and/or air is introduced or removed from the system. For example, in one embodiment, the port 1311 is an exhaust port, wherein the exhaust port allows for gas, air, or volatile compounds to escape. In another embodiment, the port 1311 is an inlet port for introducing water or other fluid to the system. For example, in one embodiment, water is added to a processed spirit to reduce the proof of the finished product. In another embodiment, water or another fluid is added via the port 1311 or the main reservoir 301 to clean the system, wherein the water or other fluid is introduced, processed through the AAS, and drained. In a further embodiment, the port 1311 is operable to serve as an outlet port for the AAS, wherein some or all of the working fluid is removed via the port 1311 after processing. In one embodiment, the AAS is operable to automatically or manually open or close the port 1311 based on preset inlet or outlet conditions (e.g., a set amount of water to be added, a set amount of gas infusion, and/or a set amount of working fluid to drain). In another embodiment the AAS is operable to automatically or manually open or close the port 1311 based on determined sensor conditions (e.g., an amount of water to be added to reduce the proof of a spirit, a set amount of gas infusion to maintain a dissolved oxygen level, and/or an amount of fluid necessary to remove before returning the working fluid to the main reservoir 301 for reprocessing).

Figure 15:
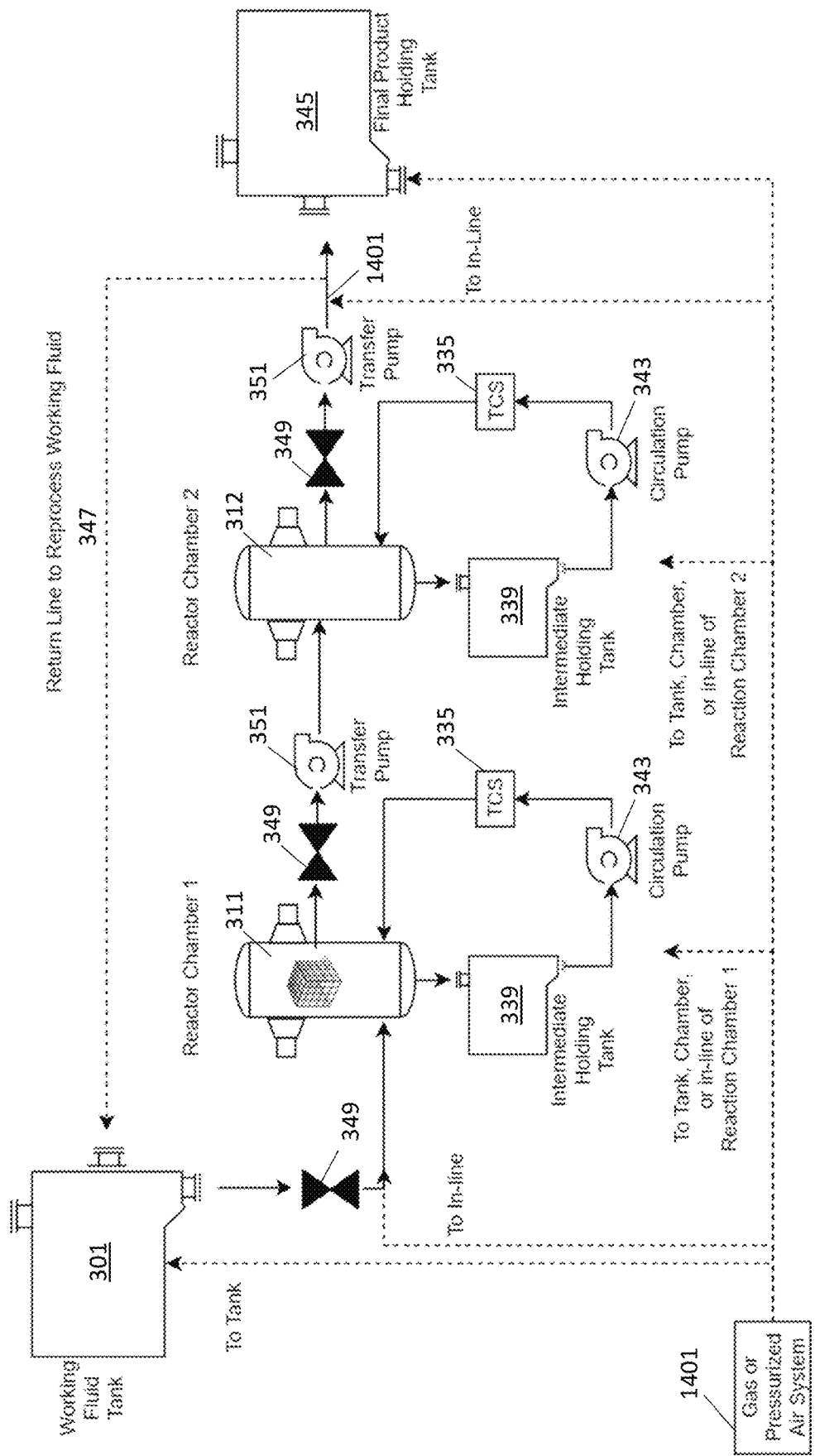
FIG. 15 illustrates a schematic of an accelerated aging system with two reaction chambers in series according to one embodiment of the present invention.

FIG. 15 illustrates a schematic of yet another embodiment of the AAS, wherein the dual reaction chambers (311, 312) are positioned in series, wherein a first reaction chamber 311 with a dedicated circulation and holding system feeds directly into a second reaction chamber 312 with a second dedicated circulation and holding system. In the illustrated embodiment, each reaction chamber (311, 312) includes a holding tank 339, circulation pump 343, and TCS 335. In one embodiment, the TCS 335 is the same system for each of the reaction chambers. In another embodiment, each reaction chamber (311, 312) has a dedicated TCS 335. The series construction allows for continuous processing of the spirit across multiple stages. For example, in one embodiment, a first batch is heated in the presence of wood in the first reaction chamber 311, while a second batch is heated without wood present in the second reaction chamber 312. In one embodiment, at least one TCS 335 is attached to a holding tank 339 for one or more of the reaction chambers (312, 311). In one embodiment, the AAS includes at least one valve 349 and at least one fluid transfer pump 351 before and/or after each of the reaction chambers, wherein the at least one valve 349 is operable to be controlled automatically or manually, and wherein the at least one valve 349 in combination with the at least one fluid transfer pump 351 is operable to transfer fluid between the main reservoir 301, each of the reaction chambers (311, 312), the corresponding reaction chamber processing systems, and the final holding tank 345. The AAS is operable, in one embodiment, to automatically and/or manually redirect the processed fluid to the final holding tank 345, wherein the final holding tank 345 is, in one embodiment, a tank similar to the working fluid tank 301, and wherein in another embodiment, the final holding tank 345 is replaced with an outlet drain, an external reservoir, an external tank, a barrel, or any other external receiving and/or holding mechanism. In one embodiment, a valve is operable to open, close, and/or otherwise redirect processed fluid to the final holding tank 345 automatically or manually. For example, the AAS is operable to receive sensor inputs detecting one or more levels of a processed fluid and determine, based on the sensor levels, whether one or more preset thresholds have been met. If the preset thresholds have not been met, the AAS is operable to direct the fluid to the main reservoir 301 and/or prevent the fluid from being directed to the final holding tank 345, and wherein the fluid is reprocessed via one or more additional stages through the AAS. FIG. 15 further illustrates a gas or pressurized air system 1401, wherein the gas or pressurized air system 1401 is operable to introduce oxygen, atmospheric gas, or other gasses at one or more points within the AAS. For example, in the illustrated embodiment, the gas or pressurized air system 1401 is operable to supply gas to the main reservoir 301, to the first reaction chamber 311, to any point within the first reaction chamber system (e.g., an intermediate holding tank 339 or at any point on one or more corresponding fluid transfer lines), to the second reaction chamber 312, to any point within the second reaction chamber system (e.g., an intermediate holding tank 339 or at any point on one or more corresponding fluid transfer lines), to an end point in the processing line 1403, and/or to the holding tank 345. In one embodiment, the end point in the processing line 1403 includes one or more valves, wherein the valve is operable to direct at least some amount of the working fluid to the main reservoir 301 for further processing.

In one embodiment, the AAS includes three or more reaction chambers, wherein two or more of the at least three reaction chambers include at least some wood load. In one embodiment, the chambers are connected via a transfer pump 351 and/or a bypass line that directs to the three or more reaction chambers. Advantageously, this allows for a first working fluid batch to be passed through a reaction chamber with a wood load and for a second working fluid batch to be passed through a second reaction chamber with a second wood load. For example, in one embodiment, a first working fluid is processed in a first reaction chamber with wood and a second reaction chamber without wood, and wherein a second working fluid is processing a third reaction chamber with wood and the second reaction chamber without wood. This further allows for spirits to be produced that require varying amounts of wood or other organic material without the need to replace the wood every operating cycle of the AAS. Additionally, the presence of multiple reaction chambers allows for a working fluid to be treated via one or more different loads of wood or organic material during operation of the AAS. For example, in one embodiment, the working fluid is treated with a first quantity of wood and separately treated with a second quantity of wood. In another embodiment, the working fluid is treated with a first quantity of wood and separately treated with a first quantity of berries or other organic material. The AAS is operable to redirect the working fluid to one or more reaction chambers automatically or manually corresponding to the pre-programed, preset, or determined (e.g., based on sensor data) necessary chambers for desired recipe, sensory characteristics, and/or other required working fluid process. In another embodiment, the AAS includes multiple reaction chambers without wood for sanitary and/or contamination purposes, such that a first processed batch does not interact with a second processed batch.

Advantageously, two or more reaction chambers provide a level or modularity and customization that is not available in both traditional aging processes and rapid aging processes in the prior art. Specifically, the presence of two or more reaction chambers allows for the AAS to process a batch or multiple batches of product without the need to remove the organic material held by a reaction chamber between every stage change. Instead, the AAS is operable to automatically or manually redirect the spirit to the appropriate reaction chamber for processing with or without organic material. Furthermore, two or more reaction chambers allow for further customization of batch size, wherein, for example, a reaction chamber for a first stage is operable to hold 1 L of product at a time, whereas a reaction chamber for a second stage operates on 500 mL of product at a time.

In an alternative embodiment, the AAS is operable to drain the working fluid in a reaction chamber to a level below that of any contained organic material. This allows for processing of the working fluid during any of the stages, wherein the organic material does not interact with the fluid during the processing.

A control system is operable in one embodiment to monitor environmental and internal variables at every stage of the aging process. Preferably, at least one temperature sensor is employed. Additional sensors operable to be utilized alone or in combination include: pressure sensors, gaseous oxygen sensors, dissolved oxygen sensors, pH sensors, near-infrared (NIR) or infrared light sensors, total dissolved solid sensors, refractometers, air flow sensors, electroconductivity and/or impedance sensors, light and/or color sensors, volume and/or fill-level sensors, and a flow rate sensor. In further embodiments, spectrometry instruments and sensors, including "artificial noses," are operable to be combined with artificial intelligence and machine learning to determine dissolved gasses, compounds, and corresponding flavors and/or smells of a spirit. For example, in one embodiment, STAGE 1 proceeds with sonication until a preset concentration or ratio of esters, an amount of dissolved solids, or an amount of particulates are present within the liquid. In another embodiment, the AAS proceeds to heat the spirit in STAGE 2 until a color within a preset range is detected. Advantageously, sensor readings, flow rates, and stage transfers are managed by a centralized computer system. The computer system is operable to receive preset variables for each stage of the operation in order to allow for customization of flavor, bouquet, and color. In one embodiment, power levels, temperatures, pressures, times and frequencies are managed directly. For example, in one embodiment, one or more reservoirs and/or reaction chambers in the AAS includes one or more sensors, wherein the AAS continues to process at a specific stage until a specific sensor reading is obtained (e.g., a dissolved oxygen level or a temperature). Alternatively, the AAS is operable to adjust and/or operate sonication and/or heating equipment to maintain one or more sensor levels or to maintain the sensor levels until the sensor level changes (e.g., in the case of boiling or removing of certain dissolved compounds). In one embodiment, dissolved or emulsified solids, liquids, or gaseous elements are monitored and maintained. For example, in an aeration stage, an amount of dissolved oxygen is monitored, and wherein the aeration stage completes upon detection of a preset level of dissolved oxygen. In another embodiment, the computer is operable to receive an indication of desired flavor (e.g., fruity, sweet, oaky, caramel, honey), wood preference (e.g., various oaks, maples, chestnuts), wood strength on palette (strong, medium, light), bouquet (e.g., floral, peaty, vanilla), mouthfeel (e.g., thick, chewy, creamy, light), smoothness (e.g., smooth, biting, harsh), and/or color (e.g., golden, reddish, or a desired HEX or RGB value corresponding to a color profile). These preferences are then processed to determine appropriate processes and parameters necessary to produce the desired result. Preferably, the system utilizes artificial intelligence, including machine learning, neural networks, deep learning, and fuzzy logic in order to determine from datasets of past batches the processes, levels, and parameters that produce a specific taste, bouquet, or color. Using these artificial intelligence processes and tools, the AAS is operable to convert an input of preferences to the appropriate parameters for each stage of the aging process.

In one embodiment, the AAS is operable to receive inputs corresponding to the above tasting notes as well as those described in FIGS. 13A-13E and in TABLE 1 and adjust the parameters accordingly. In addition, the AAS is operable to receive inputs for specific spirit styles and/or corresponding sensory notes (e.g., "scotch whiskey color") and adjust parameters based on these inputs. Exemplary sensory notes for common spirits are defined in FIG. 12. In one embodiment, an input for a desired spirit type or desired sensory characteristic associated with a spirit type is correlated with the sensory notes and parameters described in FIGS. 13A-13B and/or TABLE 1.

In one embodiment, the AAS is operable to receive an input for a desired spirit with vanilla and roasty flavors, low tannins, dark colors, and a chocolate/cherry smell. These inputs are then stored, processed, and converted to process parameters for each step. The resulting parameters include, in one embodiment, White American Oak wood input, a 55° F. (12.78° C.) STAGE 1 sonication temperature, and a 165° F. (73.9° C.) STAGE 2 heating temperature. In another embodiment, the AAS is operable to receive inputs for adjustment to the order of stages, the material ingredients, and parameters for each processing stage, wherein the AAS is operable to predict and output projected sensory characteristics (e.g., color, aroma, taste, mouthfeel) for a spirit produced via the input adjustments. In one embodiment, the projection is based on stored characteristics for each stage, material input, and parameter. In another embodiment, the projection is based on historical feedback or input received for a beverage produced via custom processing parameters. Variables considered and processed by the AAS include, in one embodiment, color, tannin presence, presence of original spirit, perception of sweetness, complexity and depth, aroma notes, aroma intensity, harshness, finish, mouthfeel, viscosity, and/or legs.

Additionally, the AAS is operable to consider input materials and characteristics of these materials in determining corresponding levels to produce flavors, aromas, colors, and other characteristics of a produced beverage. For example, in one embodiment, the AAS is operable to receive both desired sensory characteristics as well as input variables for a starting fluid, including proof, mash bill, clarity, and amount of time previously aged. The AAS is operable to adjust temperature, sonication, time, number of stages, order of stages, and gaseous infusion processes that are necessary to transform the input fluid to the desired finished product.

In one embodiment, upon production of a spirit, the AAS is operable to prompt a review of the produced beverage, receive corresponding inputs, including parameters and preferences, and store the response in a memory. Reviews in one embodiment include both numerical and non-structured scores for multiple sensory characteristics of a produced beverage, including taste, color, aroma, as well as flavor and sensory notes, such as "fruity," "flowery," "smells of caramel." These responses are uploaded to a cloud server and/or are stored in a local or cloud database for further analysis via machine learning and natural language processing. In one embodiment, parameters and sensor data of the aging process, including a time, temperature, pressure, frequency, and power level of each stage of the process, are attached, transmitted, and stored with the review information. The AAS is operable to retrieve information from the cloud server or an internal database in order to develop correlations between initial parameters and preferences and the resulting flavors and review ratings. In a further embodiment, the cloud server includes information collected from one or more aging systems, wherein the cloud server provides further experimental results for machine learning and artificial intelligence. Preferably, an historical model with correlated sensory outputs and corresponding parameter settings is developed, which is accessible by one or more accelerated aging systems.

A human-machine interface (HMI) is operable to be installed on the AAS, wherein the HMI is operable to receive inputs for desired AAS preferences and settings and send the inputs to at least one computer for processing. In one embodiment, the HMI is mechanical, wherein each of the preferences are controlled by one or more switches, sliders, knobs, levers, or buttons. In a preferred embodiment, the HMI includes at least one touchscreen with a graphical user interface (GUI), wherein the GUI is operable to display one or more digital interaction items and receive inputs corresponding to the one or more digital interaction items. In another embodiment, the HMI is a GUI on at least one mobile device or remote computer device (e.g., via at least one installed application or at least one website), wherein the AAS is in network communication with the at least one mobile device or remote computer device via at least one wired or wireless network. For example, in one embodiment, the AAS is operable to be connected over the Internet to at least one mobile device (e.g., a cell phone) or at least one remote computer (e.g., a laptop or desktop), wherein parameters and preferences for operation of the AAS, including inputs for desired characteristics and/or other system operations, are received from the at least one mobile device or at least one computer, processed by the AAS, and executed by the AAS. In an alternative embodiment, the AAS is operable to connect to and communicate with at least one mobile device or at least one remote computer device via BLUETOOTH or any other local wireless communication protocol.

Preferably, stainless steel is used for each of the main reservoir, the reaction chamber, and the heat exchanger. Stainless steel provides the durability, heat resistance, taste, smell, and color quality protection, and sanitary benefits that are necessary for effective aging. Alternatively, another metal, including copper, copper-nickel alloys, nickel-chromium alloys (e.g., INCONEL) nickel-molybdenum-chromium alloys (e.g., HASTELLOY), or other nickel-based alloys is employed for any of the main reservoir, the reaction chamber, and/or the heat exchanger.

Figure 4:
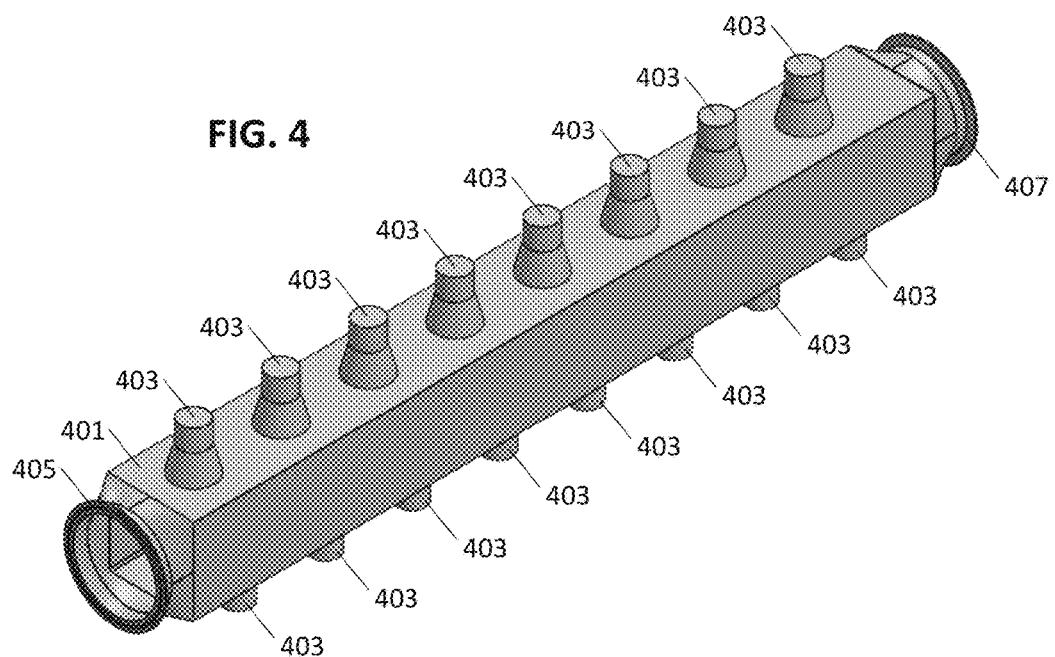
FIG. 4 illustrates a top perspective view of a self-draining reaction chamber according to one embodiment of the present invention.

FIG. 4 illustrates a perspective view of one embodiment of a self-draining sanitary reaction chamber according to the present invention, wherein a rectangular chamber 401 is attached to 16 ultrasonic transducers 403. In one embodiment, the ultrasonic transducers 403 are attached to a top and a bottom side of a reaction chamber, as illustrated. In another embodiment, the ultrasonic transducers 403 are attached to one or more sides of a reaction chamber. For example, the ultrasonic transducers 403 are operable to be attached to every flat side of a reaction chamber, including all four sides of a square or rectangular reaction chamber. The reaction chamber is operable to be attached to both the intake adapter 405 and the outlet adapter 407 and is operable to hold a removable mesh bag, tube, basket, or container that holds organic material, e.g., wood chips. The reaction chamber secures the mesh bag, tube, or container internally via a clamp, latch, snap fit, brackets, buttons, or other locking mechanism at either end of the intake adapter 405, outlet adapter 407, or in a middle of the chamber. In another embodiment, the bag is contained within a compartment, such as a permanently installed chamber, sieve, or basket. Notably, the mesh size of the mesh container can have an effect on the resulting product during each of the processing stages. Mesh size is determined based on both wood chip size and an ability for ultrasonic energy to effectively penetrate through the mesh. In one embodiment, the mesh bag is operable to be any standard mesh size, including US Mesh Sizes between 3 and 635, with opening inch sizes between 0.279 inches (7.08 millimeters) and 0.020 inches (0.020 millimeters). In another embodiment, the mesh size is between US Mesh Sizes 1 and 25. In another embodiment, the mesh size is between US Mesh Sizes 140 and 1200. In one embodiment, the mesh container is automatically or manually removable, wherein the AAS is operable to extract the mesh container with organic material from a reaction chamber automatically or based on manual operation of doors, levers, pulleys, ropes, chords, or other mechanisms. Preferably, the mesh container has a size between approximately 0.5 cubic inches and 5 cubic inches per liter of volume processed. In one embodiment, each of the intake adapter 405 and the outlet adapter 407 are attached to intake and outlet hoses connected to a main reservoir. The intake hose is preferably attached to the intake adapter 405 via a first tri clamp, and the outlet hose is attached to the outlet adapter 407 via second tri clamp. However, in other embodiments, each hose is connected via threaded mechanism, a latch, a clamp, or any other method of securely and sanitarily connecting a hose, pipe, tube, or valve to an adapter with a similar diameter.

The illustrated reaction chamber advantageously provides for self-draining conditions in addition to a flat surface for ultrasonic transducers 403 to react with flow-through liquid. Pipes are often round or have rounded corners in order to, in part, eliminate the potential for trapping and allowing the growth of bacteria or other harmful substances. Transducers, however, usually require a flat surface to impart ultrasonic energy. Advantageously, the illustrated embodiment of the present invention provides a self-draining reaction chamber with adapters and a rectangular pipe that uniquely prevent against the creation of unsanitary conditions. This design further allows for self-draining and consequently protects against contamination of foul and other unwanted flavors due to external element intrusion or residual material from processing.

In one embodiment, the inside edges of the rectangular pipe 401 are rounded to have a radius of curvature between 1/32 inches (0.0794 centimeters) and 1/8 inches (0.318 centimeters). These radii of curvatures are necessary to ensure self-draining construction and a fully draining system such that no liquid, bacteria, or other material is trapped within the reaction chamber. The rectangular pipe 401 is, in one embodiment, at least 1.8 inches (4.572 centimeters) wide, which is the minimum width required by transducers in this embodiment of the present invention. Preferably, the width is approximately 3 inches (7.620 centimeters) wide.

The rectangular pipe 401, in one embodiment, has side lengths of at least 1.5 inches (3.810 centimeters). In another embodiment, the side length is between 1.5 inches (3.810 centimeters) and 5 inches (12.700 centimeters). Preferably, the rectangular pipe 401 includes side lengths of at least approximately 3 inches (7.620 centimeters). The thickness of the rectangular pipe 401 is, in one embodiment, less than or equal to 0.2 inches (0.508 centimeters) thick. In a preferred embodiment, the thickness is between 0.03 inches (0.0762 centimeters) and 0.12 inches (0.305 centimeters). The thickness of the pipe is constructed with a thickness that is low enough to ensure a high transmission of ultrasonic power through a side of the rectangular pipe 401. Too great of a thickness harms acoustic coupling and prevents against transmission of ultrasonic power through the rectangular pipe 401. Other dimensions of the reaction chamber, including length, are determined based on a necessary reaction chamber volume and ultrasonic power levels corresponding to a size of the total system volume of spirit being processed. In one embodiment, the length of the reaction chamber is greater than or equal to 34 inches (86.360 centimeters).

In one embodiment, the rectangular pipe 401 is square shaped and includes at least one flat side for application of the transducers.

Figure 5:
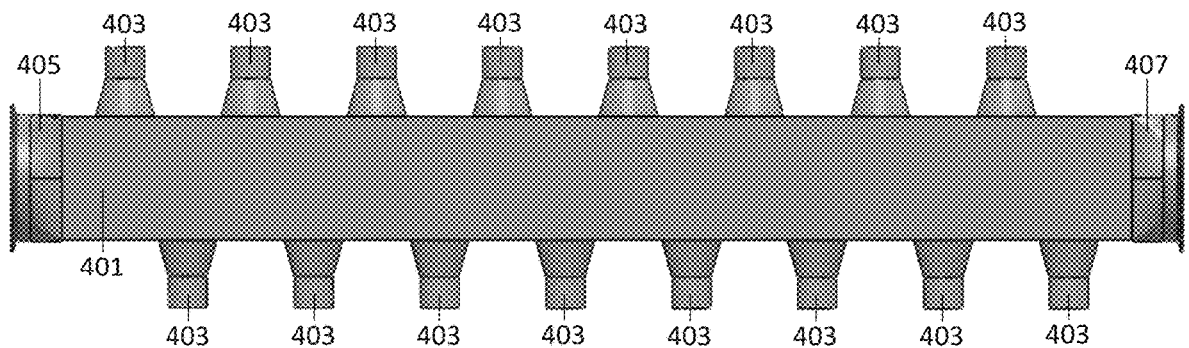
FIG. 5 illustrates a right side view of a self-draining reaction chamber according to one embodiment of the present invention.
Figure 6:
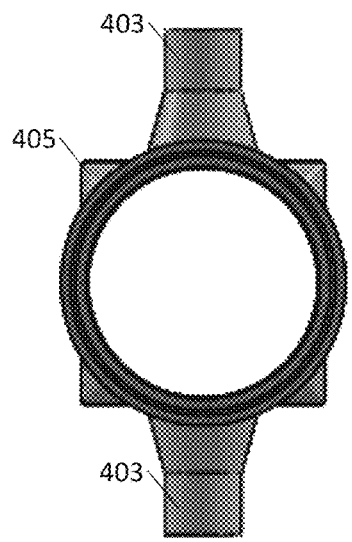
FIG. 6 illustrates a front view of a self-draining reaction chamber according to one embodiment of the present invention.

FIG. 5 illustrates a right side view of one embodiment of a self-draining reaction chamber according to the present invention. FIG. 6 illustrates a front view of one embodiment of a self-draining reaction chamber according to the present invention.

Figure 7:
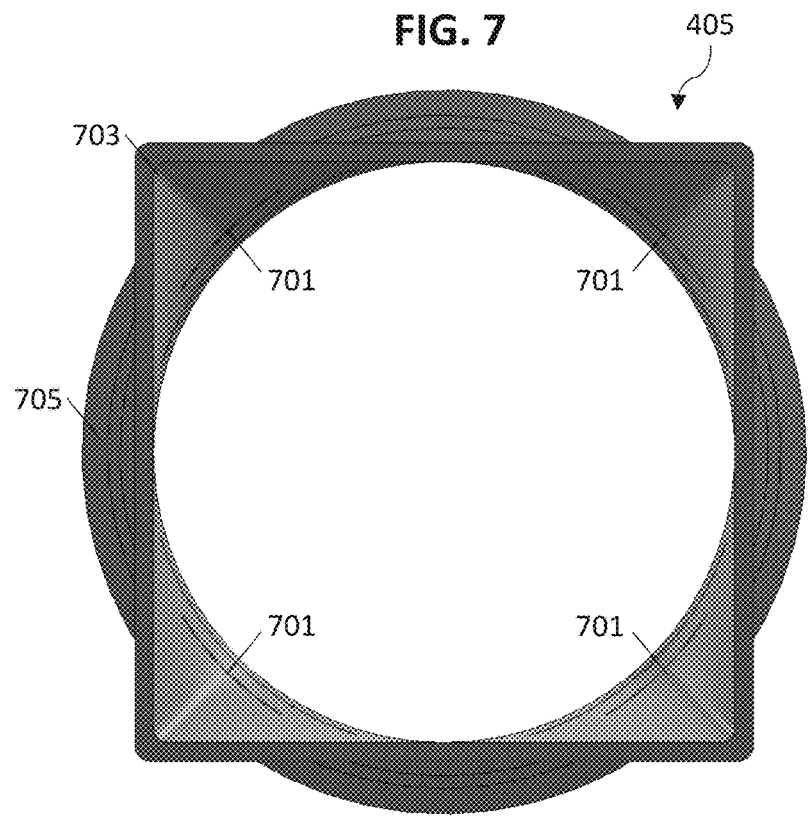
FIG. 7 illustrates a rear view of an adapter of a self-draining reaction chamber according to one embodiment of the present invention.

FIG. 7 illustrates a rear view of one embodiment of the intake adapter 405. The intake adapter 405 and the outlet adapter 407 are, in one embodiment, advantageously designed to connect a circular end of an intake or outlet line (e.g., a hose) to the rectangular pipe 401 via a gasket and a locking mechanism (e.g., a threaded attachment or a clamp). The intake adapter 405 and the outlet adapter 407 are designed with a circular to rectangular structure. In one embodiment, a circular end 705 is constructed with a thick edge for attachment via a clamp. A transition end 703 is attached to the circular end and gradually and seamlessly provides sloped transition to a rectangular profile. Preferably, four points 701 along the diameter of the circular profile, each equidistant to exactly two other points, are gradually extruded to form a square profile, wherein the square profile has an inner side length equal to the inner diameter of the circular profile. In one embodiment, an inner length of the side of the square profile is equal in length to the inner side of the rectangular pipe and a thickness of the transition end 703 is equal to a thickness of the square pipe. Preferably, the flow-through, inner diameter of the circular profile is at least approximately 2.7 inches (6.858 centimeters) and approximately 3.9 inches (9.906 centimeters). In another embodiment, the inner diameter is between approximately 3.76 inches and approximately 3.834 inches (9.738 centimeters). In another embodiment, the inner diameter is approximately 6.78 inches (17.22 centimeters). A lip of the circular profile provides a surface for securing a gasket and a lip for a clamp or other locking mechanism. In one embodiment, the outer diameter of the circular profile end is between approximately 4 inches (10.160 centimeters) and approximately 5 inches (12.700 centimeters). In a preferred embodiment, the outer diameter is greater than or equal to approximately 4.682 inches (11.892 centimeters).

Figure 8:
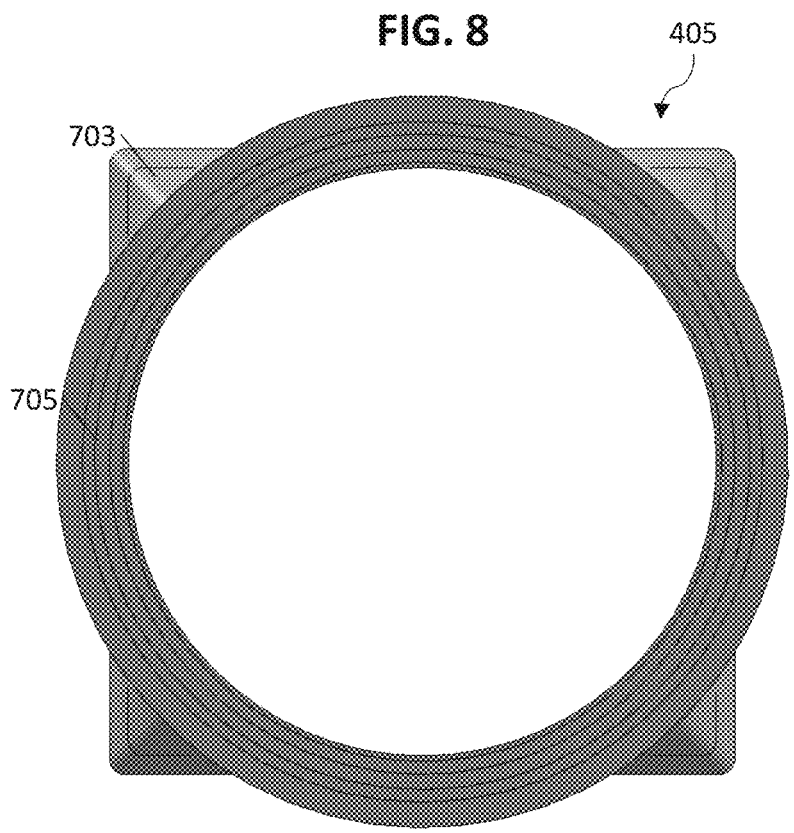
FIG. 8 illustrates a front view of an adapter of a self-draining reaction chamber according to one embodiment of the present invention.
Figure 9:
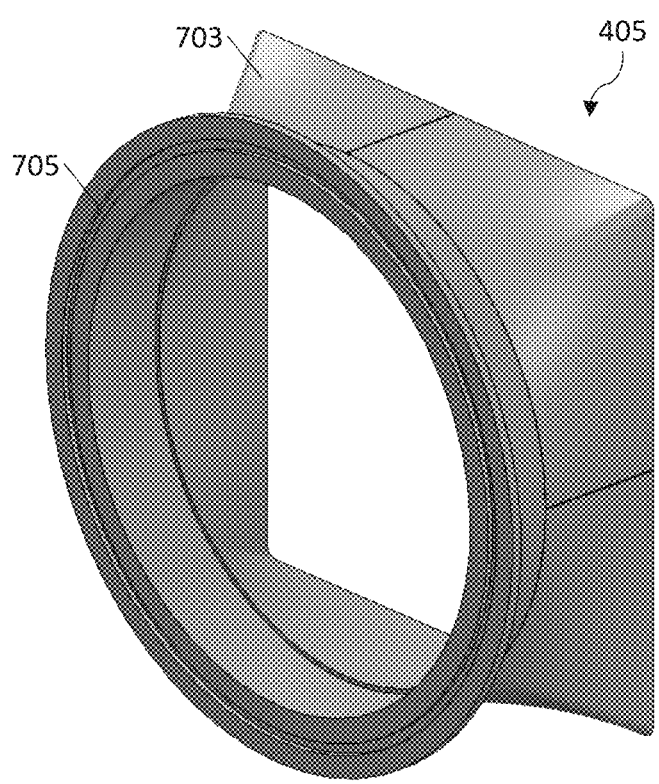
FIG. 9 illustrates a top perspective view of an adapter of a self-draining reaction chamber according to one embodiment of the present invention.

FIG. 8 illustrates a front view of an intake adapter 405 according to one embodiment of the present invention. FIG. 9 illustrates a perspective view of an intake adapter 405 according to one embodiment of the present invention.

Figure 10:
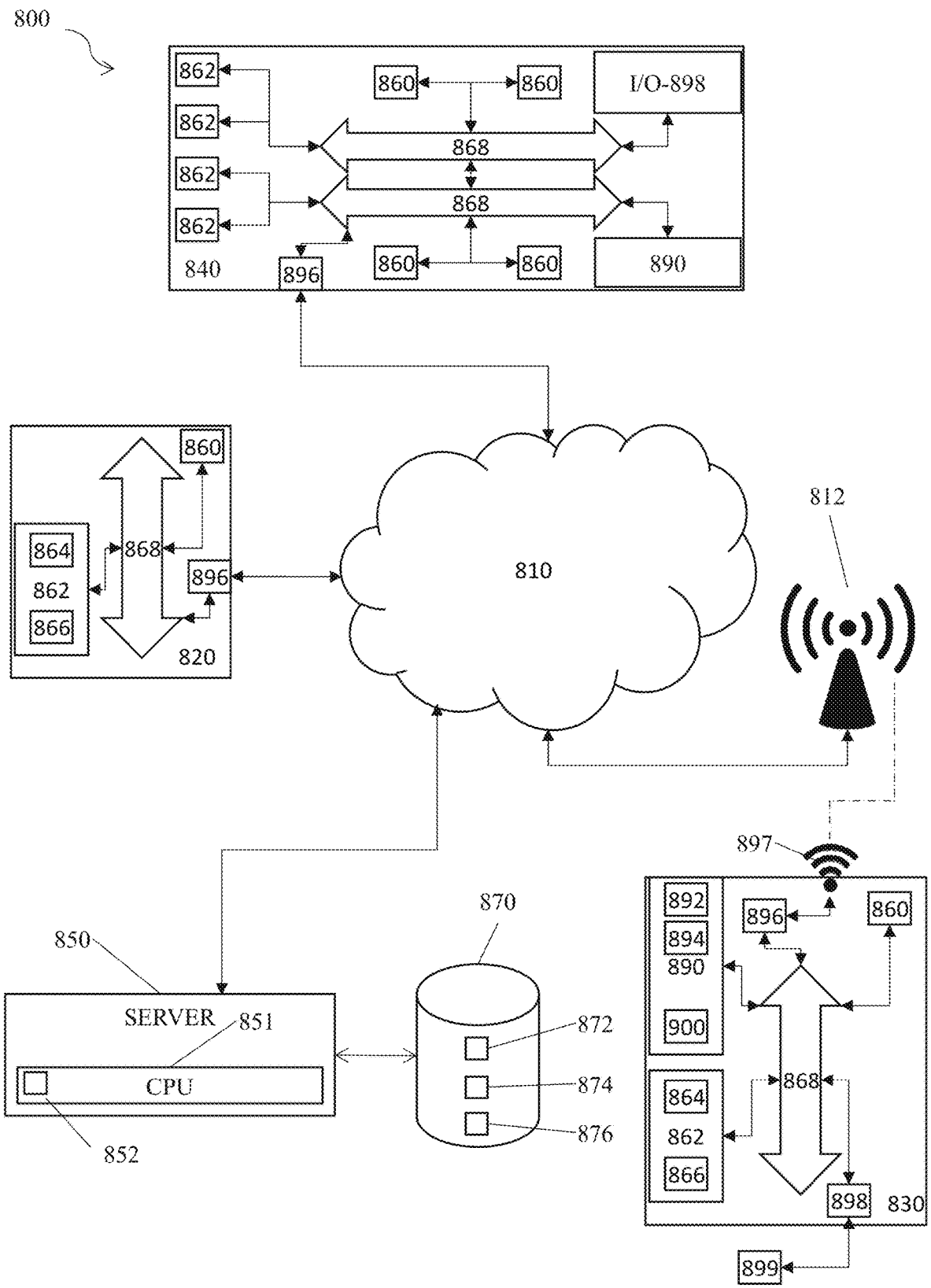
FIG. 10 is a schematic diagram of a cloud-based system of the present invention.

FIG. 10 is a schematic diagram of an embodiment of the invention illustrating a computer system, generally described as 800, having a network 810, a plurality of computing devices 820, 830, 840, a server 850, and a database 870.

The server 850 is constructed, configured, and coupled to enable communication over a network 810 with a plurality of computing devices 820, 830, 840. The server 850 includes a processing unit 851 with an operating system 852. The operating system 852 enables the server 850 to communicate through network 810 with the remote, distributed user devices. Database 870 may house an operating system 872, memory 874, and programs 876.

In one embodiment of the invention, the system 800 includes a cloud-based network 810 for distributed communication via a wireless communication antenna 812 and processing by at least one mobile communication computing device 830. Alternatively, wireless and wired communication and connectivity between devices and components described herein include wireless network communication such as WI-FI, WORLDWIDE INTEROPERABILITY FOR MICROWAVE ACCESS (WIMAX), Radio Frequency (RF) communication including RF identification (RFID), NEAR FIELD COMMUNICATION (NFC), BLUETOOTH including BLUETOOTH LOW ENERGY (BLE), ZIGBEE, Infrared (IR) communication, cellular communication, satellite communication, Universal Serial Bus (USB), Ethernet communications, communication via fiber-optic cables, coaxial cables, twisted pair cables, and/or any other type of wireless or wired communication. In another embodiment of the invention, the system 800 is a virtualized computing system capable of executing any or all aspects of software and/or application components presented herein on the computing devices 820, 830, 840. In certain aspects, the computer system 800 may be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of digital computers 820, 840, 850 and mobile devices 830, such as a server, blade server, mainframe, mobile phone, personal digital assistant (PDA), smartphone, desktop computer, netbook computer, tablet computer, workstation, laptop, and other similar computing devices. In another embodiment, the computing devices are wireless sensors and/or monitoring components attached to the AAS. The components shown here, their connections and relationships, and their functions, are meant to be exemplary only, and are not meant to limit implementations of the invention described and/or claimed in this document.

In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 may additionally include components such as a storage device 890 for storing the operating system 892 and one or more application programs 894, a network interface unit 896, and/or an input/output controller 898. Each of the components may be coupled to each other through at least one bus 868. The input/output controller 898 may receive and process input from, or provide output to, a number of other devices 899, including, but not limited to, alphanumeric input devices, mice, electronic styluses, display units, touch screens, signal generation devices (e.g., speakers), or printers.

By way of example, and not limitation, the processor 860 may be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as 840 in FIG. 10, multiple processors 860 and/or multiple buses 868 may be used, as appropriate, along with multiple memories 862 of multiple types (e.g., a combination of a DSP and a microprocessor, a plurality of microprocessors, one or more microprocessors in conjunction with a DSP core).

Also, multiple computing devices may be connected, with each device providing portions of the necessary operations (e.g., a server bank, a group of blade servers, or a multi-processor system). Alternatively, some steps or methods may be performed by circuitry that is specific to a given function.

According to various embodiments, the computer system 800 may operate in a networked environment using logical connections to local and/or remote computing devices 820, 830, 840, 850 through a network 810. A computing device 830 may connect to a network 810 through a network interface unit 896 connected to a bus 868. Computing devices may communicate communication media through wired networks, direct-wired connections or wirelessly, such as acoustic, RF, or infrared, through an antenna 897 in communication with the network antenna 812 and the network interface unit 896, which may include digital signal processing circuitry when necessary. The network interface unit 896 may provide for communications under various modes or protocols.

In one or more exemplary aspects, the instructions may be implemented in hardware, software, firmware, or any combinations thereof. A computer readable medium may provide volatile or non-volatile storage for one or more sets of instructions, such as operating systems, data structures, program modules, applications, or other data embodying any one or more of the methodologies or functions described herein. The computer readable medium may include the memory 862, the processor 860, and/or the storage media 890 and may be a single medium or multiple media (e.g., a centralized or distributed computer system) that store the one or more sets of instructions 900. Non-transitory computer readable media includes all computer readable media, with the sole exception being a transitory, propagating signal per se. The instructions 900 may further be transmitted or received over the network 810 via the network interface unit 896 as communication media, which may include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory, or other solid state memory technology; discs (e.g., digital versatile discs (DVD), HD-DVD, BLU-RAY, compact disc (CD), or CD-ROM) or other optical storage; magnetic cassettes, magnetic tape, magnetic disk storage, floppy disks, or other magnetic storage devices; or any other medium that can be used to store the computer readable instructions and which can be accessed by the computer system 800.

It is also contemplated that the computer system 800 may not include all of the components shown in FIG. 10, may include other components that are not explicitly shown in FIG. 10, or may utilize an architecture completely different than that shown in FIG. 10. The various illustrative logical blocks, modules, elements, circuits, and algorithms described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

The above-mentioned examples are provided to serve the purpose of clarifying the aspects of the invention, and it will be apparent to one skilled in the art that they do not serve to limit the scope of the invention. By way of example, in one embodiment, the step of heating without wood present is performed both before and after sonication. In another embodiment, the organic aging material includes but is not limited to at least one of seeds, vanilla beans, or herbs. By nature, this invention is highly adjustable, customizable and adaptable. The above-mentioned examples are just some of the many configurations that the mentioned components can take on. All modifications and improvements have been deleted herein for the sake of conciseness and readability but are properly within the scope of the present invention.

What is claimed is:

1. A system for accelerating aging of a beverage, comprising:

at least two reaction chambers, including a first reaction chamber and a second reaction chamber, wherein the first reaction chamber includes a wood load, and wherein the second reaction chamber does not include wood;

at least one first ultrasonic transducer and at least one second ultrasonic transducer, wherein the at least one first ultrasonic transducer is operable to apply ultrasonic energy to contents of the first reaction chamber and the at least one second ultrasonic transducer is operable to apply ultrasonic energy to contents of the second reaction chamber;

at least one temperature control system, wherein the at least one temperature control system includes at least one heating system and at least one cooling system;

at least one fluid circulation pump;

at least one valve;

at least one gas infusion system; and a fluid;

wherein the at least one fluid circulation pump is operable to circulate the fluid between the first reaction chamber and the second reaction chamber, and wherein the at least one valve is operable to open or close a connection between the first reaction chamber and the second reaction chamber;

wherein the at least one first ultrasonic transducer is operable to apply a first ultrasonic energy to the fluid in the first reaction chamber, and wherein the at least one temperature control system is operable to simultaneously cool the fluid for at least some time during the application of the first ultrasonic energy;

wherein the at least one temperature control system is operable to apply a first heat to the fluid and increase a temperature of the fluid;

wherein the at least one second ultrasonic transducer is operable to apply a second ultrasonic energy to the fluid in the second reaction chamber, and wherein the at least one temperature control system is operable to simultaneously cool the fluid for at least some time during the application of the second ultrasonic energy;

wherein the at least one temperature control system is operable to apply a second heat to the fluid and increase the temperature of the fluid;

wherein the at least one first ultrasonic transducer is operable to apply the first ultrasonic energy, the at least one temperature control system is operable to apply the first heat, the at least one second ultrasonic transducer is operable to apply the second ultrasonic energy, and the at least one temperature control system is operable to apply the second heat, respectively, in sequence;

wherein the valve is operable to close the connection between the first reaction chamber and the second reaction chamber before the application of the second ultrasonic energy; and wherein the at least one gas infusion system is operable to introduce at least one gas to the fluid.

2. The system of claim 1, wherein the at least one first ultrasonic transducer is operable to apply the first ultrasonic energy to the fluid in the first reaction chamber at a rate of at least 5 watt-hours per liter, and wherein the at least one second ultrasonic transducer is operable to apply the second ultrasonic energy to the fluid in the second reaction chamber at a rate of at least 5 watt-hours per liter.

3. The system of claim 1, wherein the at least one temperature control system is operable to maintain a temperature of the fluid below approximately 85° F. while the at least one first ultrasonic transducer applies the first ultrasonic energy to the fluid in the first reaction chamber.

4. The system of claim 3, wherein the at least one temperature control system is operable to maintain the temperature of the fluid below approximately 75° F. while the at least one first ultrasonic transducer applies the first ultrasonic energy to the fluid in the first reaction chamber.

5. The system of claim 1, wherein the at least one temperature control system is operable to maintain a first temperature of the fluid between approximately 120° F. and approximately 165° F. during the application of the first heat to the fluid in the first reaction chamber and a second temperature of the fluid between approximately 120° F. and approximately 165° F. during the application of the second heat to the fluid in the second reaction chamber.

6. The system of claim 1, wherein the at least one temperature control system is operable to apply the first heat for at least approximately 12 hours, and wherein the at least one temperature control system is operable to apply the second heat for at least approximately 24 hours.

7. The system of claim 1, further comprising at least one computer device, wherein the at least one computer device is operable to receive at least one input corresponding to desired sensory information, including at least one of an aroma, a taste, a color, or a mouthfeel, and wherein the at least one computer device is operable to determine and adjust at least one corresponding parameter for the application of the first ultrasonic energy, the application of the first heat, the application of the second ultrasonic energy, and/or or the application of the second heat based on the at least one input.

8. The system of claim 1, further comprising a holding reservoir, wherein the holding reservoir is connected to the at least two reaction chambers.

9. The system of claim 1, wherein the fluid is an alcoholic beverage.

10. A system for accelerated aging of a beverage, comprising:
    at least two reaction chambers, including a first reaction chamber and a second reaction chamber, wherein the first reaction chamber includes an organic material load, and wherein the second reaction chamber does not include organic material;
    at least one first ultrasonic transducer and at least one second ultrasonic transducer, wherein the at least one first ultrasonic transducer is operable to apply ultrasonic energy to contents of the first reaction chamber and the at least one second ultrasonic transducer is operable to apply ultrasonic energy to contents of the second reaction chamber;
    at least one temperature control system;
    at least one fluid circulation pump;
    a gas infusion system;
    a fluid; and
    an organic material;
    wherein the at least one first ultrasonic transducer is operable to apply a first ultrasonic energy to the fluid in the first reaction chamber, and wherein the at least one temperature control system is operable to simultaneously maintain a first temperature of the fluid in the first reaction chamber below approximately 85° F.;
    wherein the at least one temperature control system is operable to apply a first heat to the fluid and simultaneously maintain a second temperature of the fluid above approximately 120° F.;
    wherein the at least one second ultrasonic transducer is operable to apply a second ultrasonic energy to the fluid in the second reaction chamber, and wherein the at least one temperature control system is operable to simultaneously cool the fluid for at least some time during the application of the second ultrasonic energy;
    wherein the at least one temperature control system is operable to apply a second heat to the fluid and maintain a third temperature of the fluid in the second reaction chamber of at least approximately 120° F.;
    wherein the applying the first ultrasonic energy, the applying the first heat, the applying the second ultrasonic energy, and the applying the second heat do not occur simultaneously; and
    wherein the gas infusion system is operable to introduce at least one gas to the fluid.

11. The system of claim 10, wherein the at least at least one first ultrasonic transducer is operable to apply the first ultrasonic energy and the at least one temperature control system is operable to apply the first heat before both the at least one second ultrasonic transducer applies the second ultrasonic energy and the at least one temperature control system applies the second heat.

12. The system of claim 10, wherein the at least one temperature control system includes at least one heating element, at least one cooling system, and at least one circulation pump.

13. The system of claim 10, wherein the at least one temperature control system includes a heat exchanger operable to heat and cool the fluid.

14. The system of claim 10, wherein the at least one first ultrasonic transducer is in contact with at least one flat side of the first reaction chamber, and wherein the at least one second ultrasonic transducer is in contact with at least one flat side of the second reaction chamber.

15. The system of claim 10, wherein the at least one first ultrasonic transducer is operable to apply the first ultrasonic energy, the at least one temperature control system is operable to apply the first heat, the at least one second ultrasonic transducer is operable to apply the second ultrasonic energy, or the at least one temperature control system is operable to apply the second heat, respectively, for at least two iterations, and wherein the gas infusion system is operable to introduce the at least one gas to the fluid between the at least two iterations.

16. The system of claim 15, wherein the gas infusion system is operable to introduce the at least one gas to the fluid for at least approximately 5 minutes between the predetermined intervals.

17. The system of claim 10, wherein the organic material load is a wood load.

18. The system of claim 10, further comprising at least one valve, wherein the at least one valve is operable to close a connection between the first reaction chamber and the second reaction chamber before the application of the second ultrasonic energy.

* * * * *